US010593104B2

(12) United States Patent
Robert et al.

(10) Patent No.: US 10,593,104 B2
(45) Date of Patent: Mar. 17, 2020

(54) SYSTEMS AND METHODS FOR GENERATING TIME DISCRETE 3D SCENES

(71) Applicant: Autodesk, Inc., San Rafael, CA (US)

(72) Inventors: Luc Robert, Valbonne (FR); Emmanuel Gallo, South San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 373 days.

(21) Appl. No.: 15/394,689

(22) Filed: Dec. 29, 2016

(65) Prior Publication Data

US 2017/0193693 A1 Jul. 6, 2017

Related U.S. Application Data

(60) Provisional application No. 62/273,695, filed on Dec. 31, 2015.

(51) Int. Cl.
| | |
|---|---|
| *H04N 7/00* | (2011.01) |
| *H04N 13/00* | (2018.01) |
| *G06T 17/00* | (2006.01) |
| *H04N 13/25* | (2018.01) |
| *G01B 11/24* | (2006.01) |

(Continued)

(52) U.S. Cl.
CPC ............. *G06T 17/00* (2013.01); *G01B 11/24* (2013.01); *G06K 9/00664* (2013.01); *G06K 9/00671* (2013.01); *G06T 7/55* (2017.01); *G06T 19/006* (2013.01); *H04N 1/00* (2013.01); *H04N 13/25* (2018.05); *G06K 2209/40* (2013.01)

(58) Field of Classification Search
CPC ................................. H04N 13/00; H04N 7/18
See application file for complete search history.

(56) References Cited

U.S. PATENT DOCUMENTS 5,910,817 A * 6/1999 Ohashi ............... G06K 9/00208
340/903
6,411,742 B1 6/2002 Peterson
(Continued)

OTHER PUBLICATIONS

Hartley and Zisserman, "Multiple View Geometry in Computer Vision," Cambridge University Press, (2003) pp. 155-157, ISBN 0-521-54051-8.
(Continued)

*Primary Examiner* — Maryam A Nasri
(74) *Attorney, Agent, or Firm* — Fish & Richardson P.C.

(57) ABSTRACT

Methods, systems, and apparatus including medium-encoded computer program products for generating and visualizing 3D scenes include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data; reconstructing a series of three dimensional (3D) modeled scenes of the physical site from the site data using the imaging data, the coordinate data, and the time metadata; receiving a request having associated position, orientation and time data; and generating, in response to the request, output for display of a portion of the 3D modeled scenes to represent the physical site based on the position, orientation and time data.

30 Claims, 11 Drawing Sheets

(51) Int. Cl.
*G06K 9/00* (2006.01)
*H04N 1/00* (2006.01)
*G06T 7/55* (2017.01)
*G06T 19/00* (2011.01)

(56) References Cited

U.S. PATENT DOCUMENTS

| | | | |
|---|---|---|---|
| 6,473,081 | B1 | 10/2002 | Silva et al. |
| 7,362,368 | B2 | 4/2008 | Steinberg et al. |
| 7,379,621 | B2 | 5/2008 | Aoki |
| 7,428,007 | B2 | 9/2008 | Kitaguchi et al. |
| 7,484,183 | B2 | 1/2009 | Look et al. |
| 7,508,977 | B2 | 3/2009 | Lyons et al. |
| 7,573,475 | B2 | 8/2009 | Sullivan et al. |
| 7,595,826 | B2 | 9/2009 | Aoki et al. |
| 7,995,861 | B2 | 8/2011 | Jin et al. |
| 8,065,123 | B2 | 11/2011 | Wood |
| 8,106,995 | B2 | 1/2012 | Tamaru |
| 8,402,392 | B2 | 3/2013 | Look et al. |
| 8,463,580 | B2 | 6/2013 | Wood |
| 8,698,899 | B2 | 4/2014 | Nakamura et al. |
| 8,717,578 | B2 | 5/2014 | Ohnishi et al. |
| 8,732,125 | B2 | 5/2014 | Omansky et al. |
| 8,878,840 | B2 | 11/2014 | Keough et al. |
| 9,053,080 | B2 | 6/2015 | Look et al. |
| 9,679,038 | B2 | 6/2017 | Omansky et al. |
| 10,074,214 | B2 | 9/2018 | La Fleur et al. |
| 2010/0077316 | A1 | 3/2010 | Omansky et al. |
| 2014/0225985 | A1* | 8/2014 | Klusza ............... H04N 13/0207 348/43 |

OTHER PUBLICATIONS

"UV mapping," [online] [Retrieved on Aug. 5, 2015]; Retrieved from the Internet URL: https://en.wikipedia.org/wiki/UV_mapping; 3 pages.

"Camera resectioning," [online] [Retrieved on Aug. 5, 2015]; Retrieved from the Internet URL: http://en.wikipedia.org/wiki/Camria_resectioning; 5 pages.

Triggs et al., "Bundle adjustment—a modern synthesis," In Vision algorithms: theory and practice, pp. 298-372, Springer Berlin Heidelberg, 2000.

Hiep et al., "Towards high-resolution large-scale multi-view stereo," In Computer Vision and Pattern Recognition, 2009, CVPR 2009, IEEE Conference on, pp. 1430-1437, IEEE, 2009.

Bay et al., "SURF: speeded up robust features," In Computer vision—ECCV 2006, pp. 404-417, Springer Berlin Heidelberg, 2006.

Ni et al., "GroupSAC: efficient consensus in the presence of groupings," In Computer Vision, 2009 IEEE 12th International Conference on, pp. 2193-2200, IEEE, 2009.

Quan and Triggs, "A unification of autocalibration methods," In Asian Conference on Computer Vision (ACCV'00), pp. 917-922, 2000.

Pollefeys et al., "Self-calibration and metric reconstruction in spite of varying and unknown intrinsic camera parameters," International Journal of Computer Vision, 18 pages (1998).

Ioannidis et al., "3D detailed reconstruction of a demolished building by using old photographs," International Archives of Photogrammetry and remote sensing, vol. XXXI, Part B5, pp. 16-21 (1996).

"3D models of old towns," [online] [Retrieved on May 7, 2015]; Retrieved from the Internet URL: https://photosynth.net/discussion.aspx?cat=a03647b9-821e-439b-8dbc-ae0239d6870d&dis=2478a39e-70a4-4291-b189-a586e2a457cd; 1 page.

"ReCap product news," [online] [Retrieved on May 7, 2015]; Retrieved from the Internet URL: http://www.recapproduct.com/blog/2014/08/; 16 pages.

Wu et al., "3D model matching with viewpoint-invariant patches (VIP)," [online] [Retrieved on Dec. 20, 2016]; Retrieved from the Internet URL: http://frahm.web.unc.edu/files/2014/01/3D-Model-Matching-with-Viewpoint-Invariant-Patches-VIP.pdf/; 8 pages.

* cited by examiner

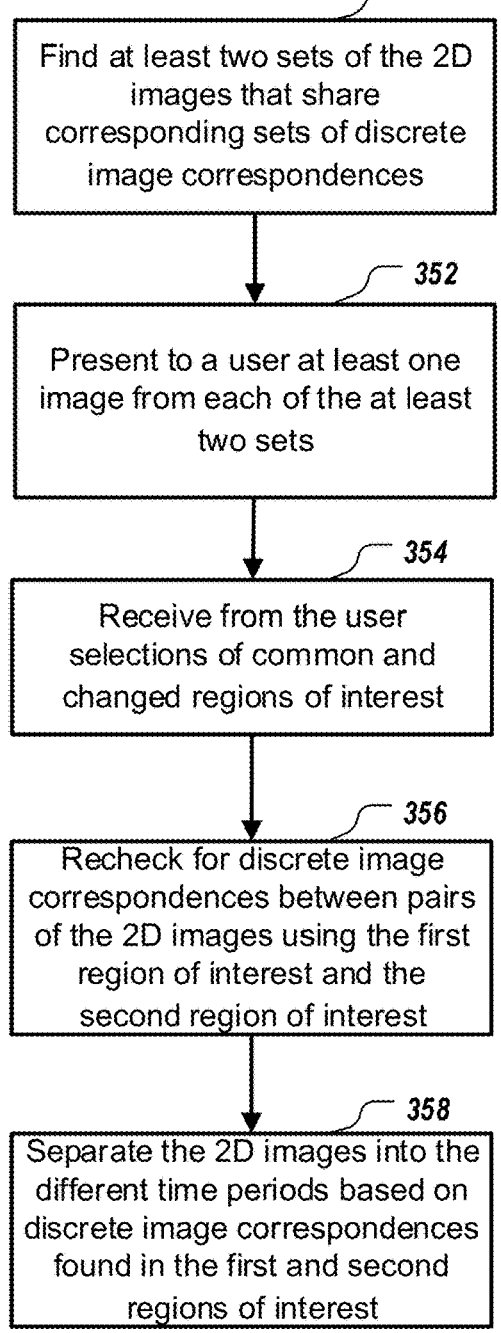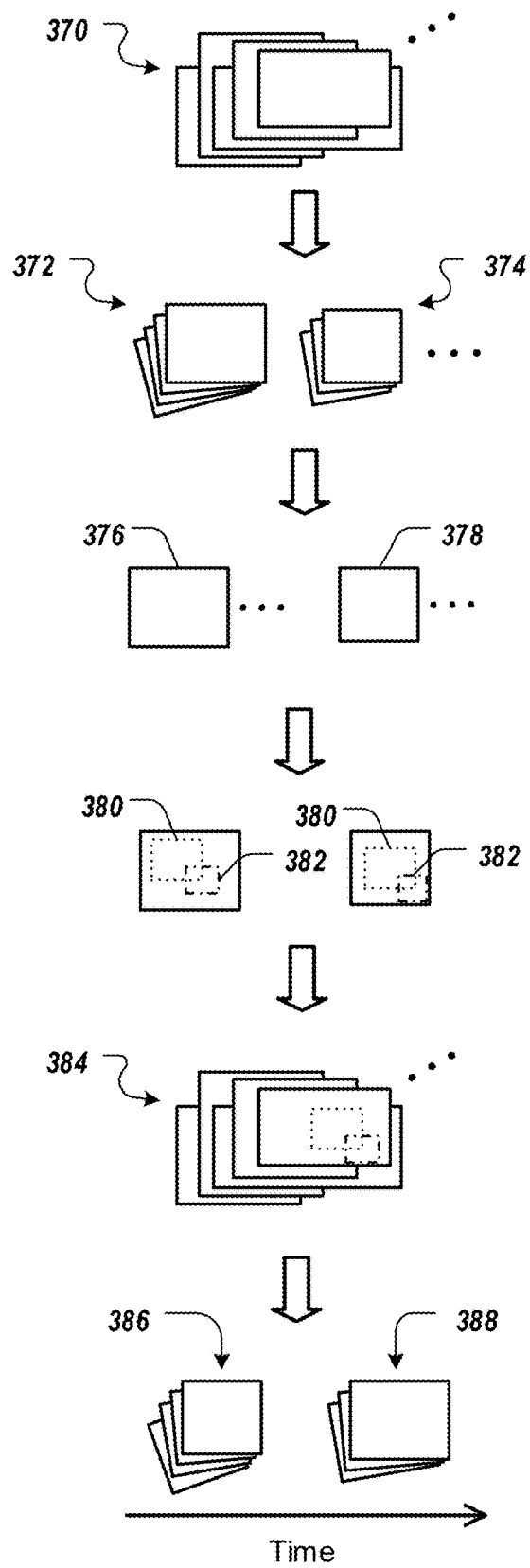
FIG. 3B
FIG. 3C

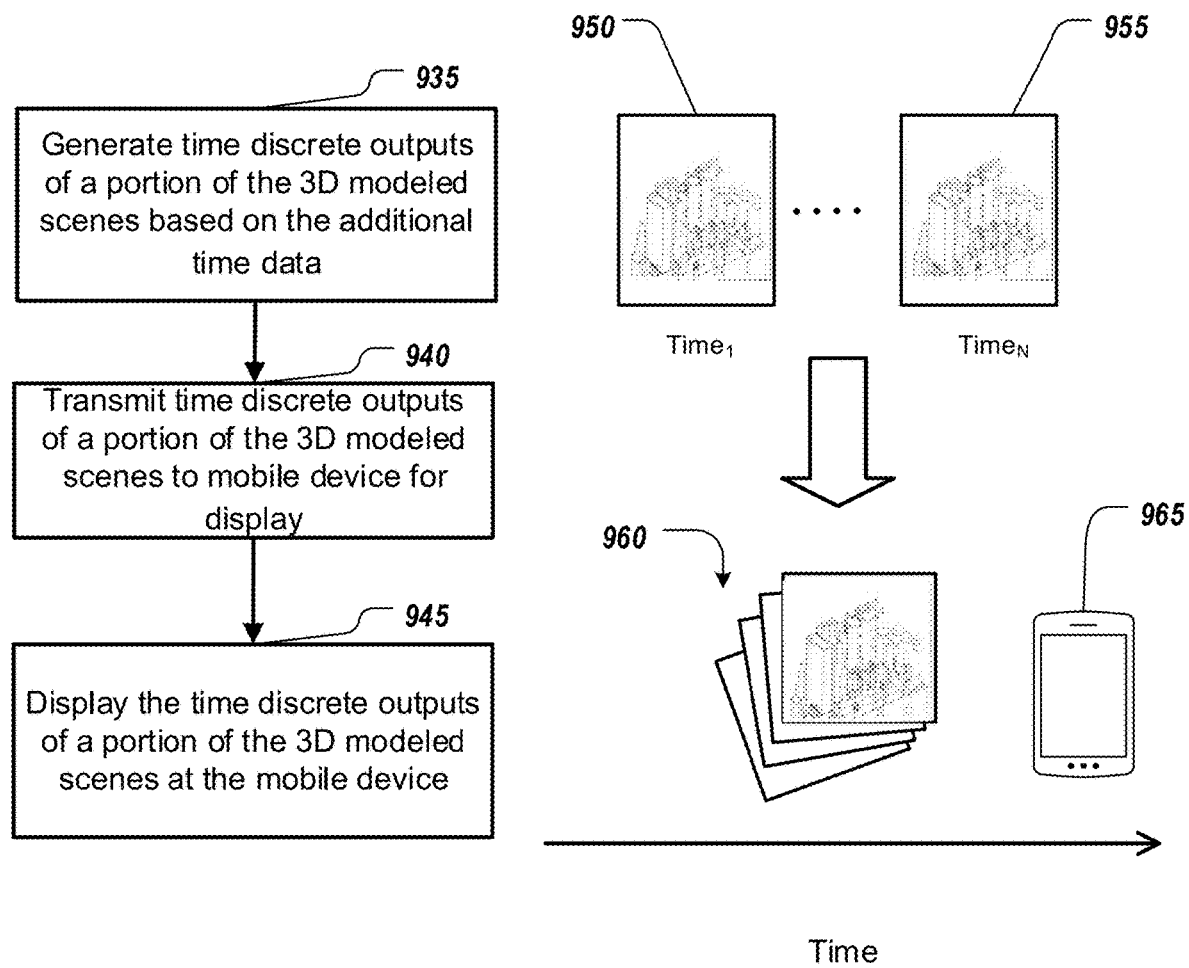

SYSTEMS AND METHODS FOR GENERATING TIME DISCRETE 3D SCENES

CROSS-REFERENCE TO RELATED APPLICATION

This application claims the benefit under 35 U.S.C. § 119(e) of U.S. Patent Application No. 62/273,695, entitled "SYSTEMS AND METHODS FOR GENERATING 3D SCENES WITH TIME ELEMENT FOR DISPLAY", filed Dec. 31, 2015, which is incorporated herein by reference in its entirety.

BACKGROUND

This specification relates to three dimensional (3D) modeling programs and rendering of 3D scenes for construction field management operations, including generating 3D scenes with a time element for display.

Current technology allows for camera changing views within 3D scenes. A good example of this is a simple animation in a city or STREET VIEW® online software, available from Google Inc. of Mountain View, Calif., which displays geographic information, interactive geographic maps, and images of maps and mapped locations. The view is based upon fixed architecture, or in the case of some created 3D scenes, the imagination of whoever created the scene. For many visualizations, there exists no current scene, such as because a building or street has changed, been destroyed or has been significantly upgraded.

In addition, in the context of building information management systems, various visualization and information delivery techniques have been used. For example, U.S. Patent Application No. 2010/0077316 describes methods and systems for inspecting and managing information in a collaborative construction project, U.S. Pat. No. 8,732,125 describes systems and methods for construction field management and operations with building information modeling, and U.S. Pat. No. 8,878,840 describes devices and methods for displaying a sub-section of a virtual model. All three of the patent documents (U.S. Patent Application No. 2010/0077316; U.S. Pat. Nos. 8,732,125; and 8,878,840) are hereby incorporated by reference.

SUMMARY

This specification describes technologies relating to 3D modeling programs and visualizations of 3D scenes, including generating 3D scenes with a time element for display.

In general, one or more aspects of the subject matter described in this specification can be embodied in one or more methods that include: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data; reconstructing a series of three dimensional (3D) modeled scenes of the physical site from the site data using the imaging data, the coordinate data, and the time metadata; receiving a request having associated position, orientation and time data; and generating, in response to the request, output for display of a portion of the 3D modeled scenes to represent the physical site based on the position, orientation and time data. These and other embodiments can optionally include one or more of the following features.

One or more aspects of the subject matter described in this specification can also be embodied in a computer-readable medium that includes: instructions programmed to cause one or more hardware processors of one or more computing devices to perform operations comprising: obtaining site data captured by one or more capture devices, wherein the site data comprises data sets corresponding to one or more viewpoints of a physical site, and each respective data set comprises imaging data of the physical site and time metadata for the imaging data; reconstructing a series of three dimensional (3D) modeled scenes of the physical site, within a reference coordinate system for the physical site, using the imaging data and the time metadata; obtaining two-dimensional (2D) image data of the physical site captured by a mobile device at the physical site; localizing the 2D image data by aligning the 2D image data with a reference 3D modeled scene from the series of 3D modeled scenes of the physical site, wherein the aligning comprises matching points in the 2D image data with the reference 3D modeled scene within the reference coordinate system; obtaining 3D information regarding the physical site and corresponding to the aligned 2D image data; and generating for display the 3D information within a context of the aligned 2D image data These and other embodiments can optionally include one or more of the following features.

In general, one or more aspects of the subject matter described in this specification can be embodied in one or more methods that include: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data; reconstructing a series of three dimensional (3D) modeled scenes of the physical site from the site data using the imaging data, the coordinate data, and the time metadata; receiving a request having associated position, orientation and time data; and generating, in response to the request, output for display of a portion of the 3D modeled scenes to represent the physical site based on the position, orientation and time data. These and other embodiments can optionally include one or more of the following features.

Particular embodiments of the subject matter described in this specification can be implemented to realize one or more of the following advantages. Two dimensional (2D) images generated from various locations about a site (e.g., a building, construction site), which may represent differing visual perspectives of the site, can be combined to generate a 3D model including a time element. This can enable visualization of a particular site in a 3D scene that corresponds to particular time, or a time discrete 3D scene. Further, multiple time discrete 3D scenes, each representing the site at a respective time, can be cooperatively displayed to create a 3D visualization of the site over time. For example, the 3D visualization can include time discrete 3D scenes superimposed onto an actual scene of the site, showing the progression of the site over a time period in the 3D space. This can have significant value in various endeavors and products, including construction timelines (e.g., construction site monitoring for management, e.g., of building construction). Thus, integrating time discrete 3D scenes reconstruction into various construction field operations may advantageously allow management capabilities to include tracking and monitoring of a site over time in a 3D environment.

The details of one or more embodiments of the subject matter described in this specification are set forth in the accompanying drawings and the description below. Other features, aspects, and advantages of the invention will become apparent from the description, the drawings, and the claims.

DRAWING DESCRIPTIONS

FIGS. 3B-3C show additional examples of processes of retrieving and matching 2D images.

FIGS. 9A-9C shows an example of a process of reconstructing and displaying time discrete 3D modeled scenes from images of a physical site.

Like reference numbers and designations in the various drawings indicate like elements.

DETAILED DESCRIPTION

Figure 1:
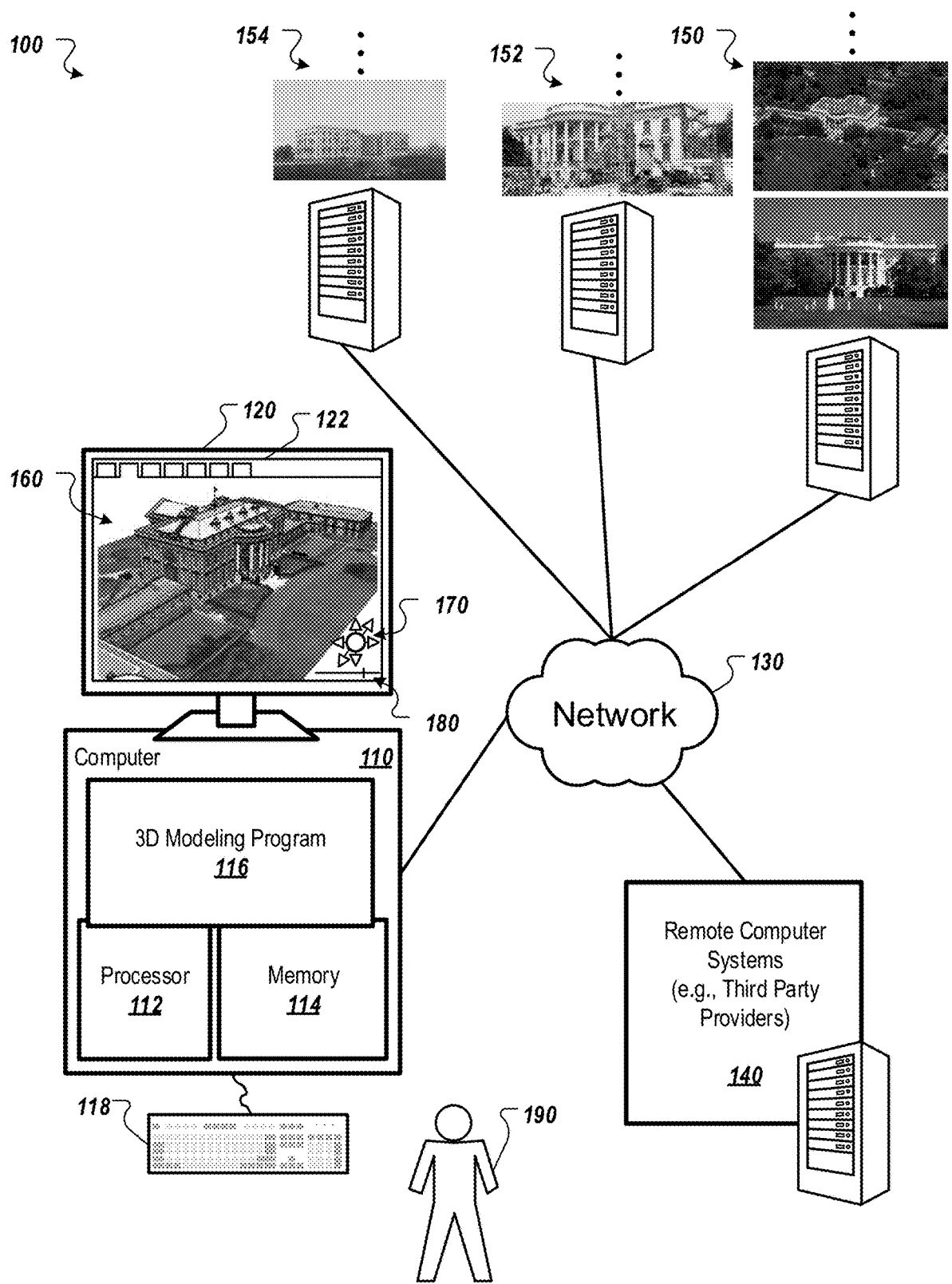
FIG. 1 shows an example of a system usable to generate, display and animate three dimensional (3D) scenes from two dimensional (2D) source images.

FIG. 1 shows an example of a system 100 usable to generate, display and animate three dimensional (3D) scenes from two dimensional (2D) source images. A computer 110 includes a processor 112 and a memory 114, and the computer 110 can be connected to a computer network 130, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110, remotely on a computer of one or more remote computer systems 140 (e.g., in a third party provider's server system accessible by the computer 110 via the network 130), or on a combination of one or more of each of the preceding. The 3D modeling program 116 presents a user interface (UI) 122 on a display device 120 of the computer 110, which can be operated using one or more input devices 118 of the computer 110 (e.g., keyboard and mouse or touch screen). Note that while shown as separate devices in FIG. 1, the display device 120 and/or input devices 118 can also be integrated with each other and/or with the computer 110, such as in a tablet computer.

The 3D modeling program 116 is programmed to generate and visualize 3D scenes using 2D images. The 3D modeling program 116 can employ known systems and techniques for generating a 3D scene from a single image. In addition, the 3D modeling program 116 can be programmed to pull 2D images from many sources and combine them into a single visualization of a 3D scene, where that single 3D visualization includes a time element.

For example, different sets of images 150, 152, 154 can be retrieved from different sources over the network 130. These different sets of images 150, 152, 154 can have very different characteristics, but in general, they can be filtered such that each image contains (or at least is suspected to contain) at least a portion of a location of interest. In the example shown, the location of interest is the US White House, but many different locations can be used, including indoor locations. Thus, the word "location" can mean the location of an object of interest (e.g., an artifact in a museum) rather than a physical location on Earth.

The different sources can include various servers that host (or point to, e.g., in search results) print references (e.g., books, magazines, flyers, other print media; most of these sources have been digitized), video feeds (e.g., closed circuit TV), and social media sites (e.g., Facebook, Twitter, Instagram). Note that millions and millions of images taken from particular locations are available on the Internet. Further, in some implementations, users can be a source of the input images, where the 3D modeling program can include in its UI 122 various UI elements that allow a user 190 to select input images for the process, either from the network 130 or from the local computer 110 (or directly attached devices, such as a smart phone).

In addition, in some implementations, the different sets of images 150, 152, 154 can include 3D images in addition to 2D images. Such 3D images can be generated using various 3D sensing devices, such as LIDAR (Light Detection and Ranging) cameras and structured light 3D cameras (e.g., the PrimeSense™ Kinect camera (available from Microsoft Corporation of Redmond, Wash.). Further, such 3D images can be generated programmatically, such as 3D models generated using CAD (Computer Aided Design) software.

Because of the variation in the sources of the images, the images in the different sets of images 150, 152, 154 will have different metadata, including some images with no metadata at all. Nonetheless, for many of the images, metadata is available, and this metadata will often include any information captured with the images, such as focal length, exposure, and GPS (Global Positing System) location. Note that such information is captured by typical smart phone cameras today. However, many of the images will not have this type of information. For example, the images 150 may have such associated information, but neither an old photograph 152 nor a scanned image 154 of a painting (showing the White House being reconstructed after the War of 1812, when it was partially destroyed) may have such associated information, or the associated information may be inaccurate. For example, if the image 154 is a photograph of the painting taken by a smart phone, the camera information included in the image 154 by the smart phone will not reflect the image details of the actual scene. Likewise, some images may have incorrect perspectives (e.g., a photo of a photo) which can be corrected by preprocessing (e.g., automated rectification or with user input) to remove deformation of the location of interest in the image.

For some of the images, metadata can be generated from the information found in association with the image or from the image itself. For example, some metadata can be generated for an image based on other information (e.g., date information) found on the Web page in proximity to the image. As another example, self-calibration can be performed on a photo to find focal length directly, such as by using the systems and methods described in Pollefeys et al., "Self-Calibration and Metric Reconstruction in spite of Varying and Unknown Intrinsic Camera Parameters", International Journal of Computer Vision 1998, the systems and techniques described in Quan et al., "A Unification of Autocalibration Methods", Asian Conference on Computer Vision (ACCV) 2000, or a combination of these. For some of the images, this information can be inferred based on the metadata available for other similar images. Thus, using the systems and method described herein, images from different sources (and having different properties) can be combined to create a 3D scene. While this process can be resource intensive, it can be achieved, such as using the expanded computing capabilities of the computing cloud or other massive data processing systems.

It is reasonable to create a particular viewpoint at any place on Earth based on a single image. With the given information associated with that image (e.g., GPS) it can be placed properly in a location. From the location, a particular view, viewport, or focal angle can be computed. From this basic information, more image data can be placed using the initial location and computing the adjacent or close by locations. There are many sources of images that may be available to construct a view with a given viewport.

In addition, the 3D modeling program 116 can be designed to determine differences in time periods for the input images, and group them according to time period, allowing the user 190 to display a digital 3D scene 160, where different times (e.g., month, year, decade, century) for the scene can be selected. In some implementations, images from different illustrations or recreations of historically accurate buildings (or other historical items) can be included in the source images, and the user 190 can use the 3D modeling program 116 to view a particular location (e.g., a specific avenue in a specific city) at a particular point in history. In addition, the UI 122 can include a UI element 170 that allows the user 190 to rotate and translate the view into the 3D space, thus displaying the 3D reconstruction of the location from many different points of view (camera view location plus camera view angle).

Different viewpoints/camera angles can be generated using the 3D model constructed from the 2D images, and any given view shown to the user can include texturing on the 3D model that either comes from the one 2D image that has the best image data for a given part of the 3D model or comes from a melding of several images together (slightly different coloring) in a manner similar to "morph" technology. Such 3D camera viewing technology and morphing technology can be leveraged to move between different data sources. In addition, in some implementations, known techniques can be used to clean up and/or meld/stitch the images together to create new data sets for the generated 3D model. Using such techniques, entirely new points of view (i.e., that did not previously exist in any of the source 2D images) can be created and displayed 160.

In addition, the UI 122 can include another UI element 180 that allows the user 190 to move through the time axis of the 3D scene generated from the source images. In some implementations, the UI elements 170 & 180 are combined. Further, in some implementations, the 3D modeling program 116 is programmed to create animations of movement in the 3D scene 160, which can include both movement in the 3D space and movement in time, where the textures placed on the 3D model of the location can be blended together for the transition from one time period to another. In some implementations, the 3D modeling program 116 is designed to let the user 190 specify paths in 3D space and time transitions, from which the 3D modeling program 116 can then generate an animation.

Figure 2:
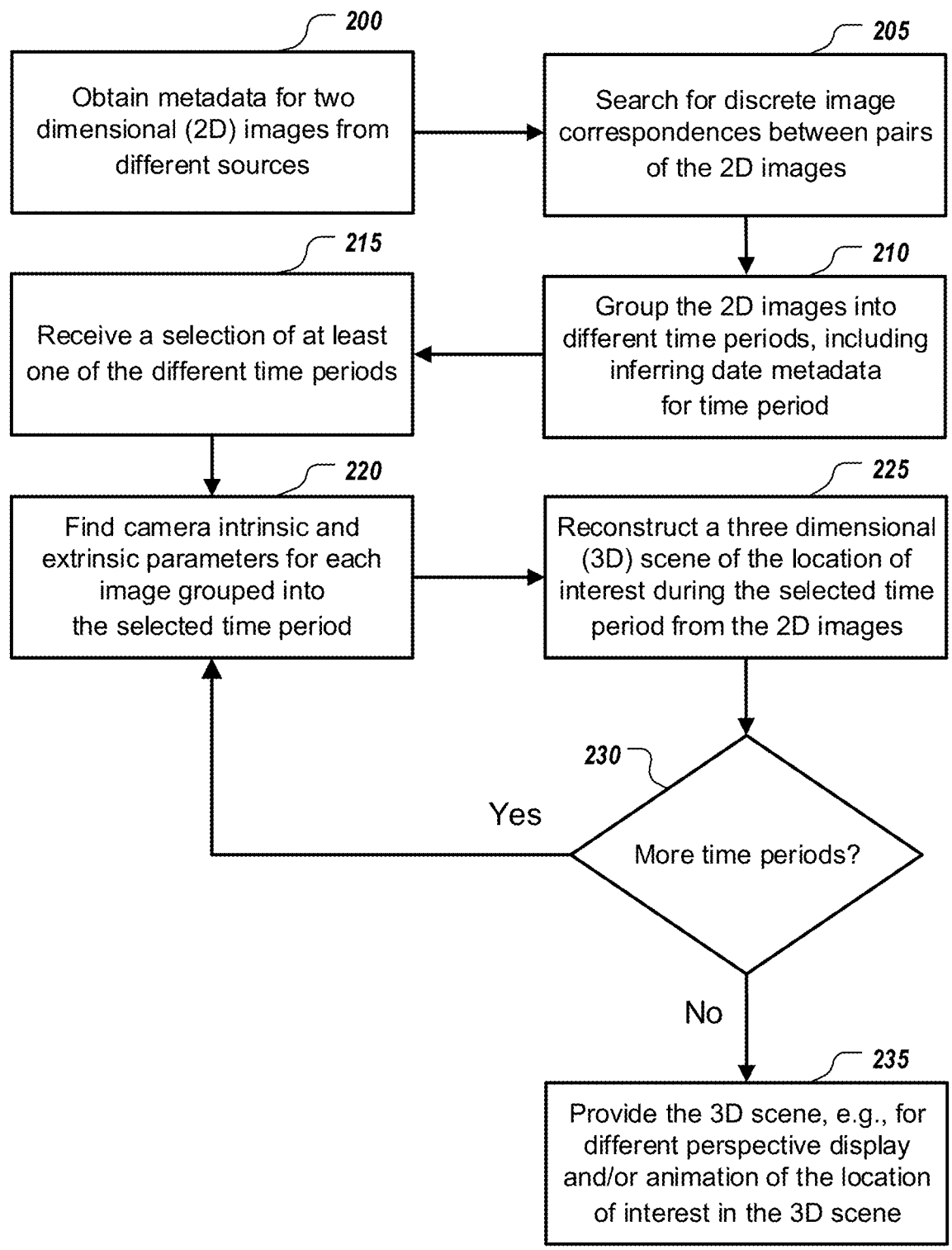
FIG. 2 shows an example of a process of creating a 3D scene from 2D source images.

FIG. 2 shows an example of a process of creating a 3D scene from 2D source images. Metadata for 2D images from different sources are obtained 200. The metadata can be existing metadata, which can be extracted from the images themselves, and/or the metadata can be new metadata created for images from information associated with the images. The 2D images are related to a location of interest (e.g., as specified by a user) can be provided as input to the process, or the obtaining 200 can include retrieving images (e.g., from the Internet) and identifying a subset of the retrieved images that likely include the location of interest.

A search 205 for discrete image correspondences between pairs of the 2D images is performed. In some implementations, this involves searching all pairs of the source 2D images. In some implementations, the pairings are limited to respective groups of the source 2D images, such as groups based on image source and/or image type, or groups based on initial image classifications (e.g., likely time periods for the images). In some implementations, the search 205 can involve known systems and methods for detecting interest points in images, comparing descriptors for these interest point between images and matching descriptors to find corresponding points between a pair of images, such as described in Bay et al., "SURF: Speeded Up Robust Features", Computer Vision and Image Understanding (CVIU), Vol. 110, No. 3, pp. 346-359, 2008, and Ni et al., "GroupSAC: Efficient Consensus in the Presence of Groupings," (2009) in 'ICCV', IEEE, pp. 2193-2200.

Further, in some implementations, 3D images can also be used as inputs, as noted above. In such implementations, registration of two 3D images with each other can be done through at least three common points between the two images. These common points can be identified manually, or extracted automatically (e.g., using salient points such as corners, using the systems and methods described in Wu et al., "3D Model Matching with Viewpoint-Invariant Patches (VIP)", Computer Vision and Pattern Recognition, 2008, or using 3D SIFT, and matching using local descriptors, e.g., SHOT, Spin Image, etc.). Thus, the processing for 3D images can be similar to that used for 2D images, with different feature extractors and local descriptors that use 3D shape. Moreover, in some implementations, additional types of data can be used as inputs, including potentially preexisting 3D models.

The 2D images (and potentially 3D images) are grouped 210 into different time periods. This can involve inferring information for a portion of the 2D images based a number of discrete image correspondences. For example, a 2D image with no metadata can have metadata generated for it based on the metadata associated with other images that are found to be similar based on a large number of identified discrete image correspondences. Other factors can also be employed to infer information (e.g., date and camera properties metadata) about source 2D images. In some implementations, one or more time periods are inferred 210 for a portion of the 2D images that do not have date metadata based on a number of discrete image correspondences found between the portion of the 2D images that do not have date metadata and one or more of the 2D images that do have date metadata.

A selection of at least one of the different time periods can be received 215. Note that this selection need not occur immediately after the grouping 210, and in some implementations, the selection 215 occurs at different points in the process. In some implementations, the user can specify the different time periods in advance, and the obtaining 200, searching 205 and grouping 210 can be performed based on this input. For example, the user may specify the Bastille in France as the location of interest, a starting year, and a date range of 50 years for the time periods, and the system can then automatically retrieve images of the Bastille (including both photos and artists' illustrations), initially place each image into one (or more) of multiple 50-year time periods, and then do image comparisons to find similarities, infer metadata and regroup the images, as needed.

Camera intrinsic and extrinsic parameters can be found 220 for each image grouped into a selected time period. Such parameters can be found in metadata for an image, by reconstruction from image data, by inference from similarities with other images, or a combination of these. Moreover, in some implementations, the camera intrinsic and extrinsic parameters can be found 220 for all the images in each respective identified time period. For example, in some implementations, all the input images are processed to generate a 3D scene that includes different 3D models (and different source images for texturing the 3D models) for different time periods, and the selection 215 can occur at the end of the process, such as when the user interacts with the user interface to specify a visualization to show how the 3D scene changes over time.

A 3D scene of the location of interest during the selected time period is reconstructed 225 from the 2D images grouped into the selected time period using the camera intrinsic and extrinsic parameters. This involves generating a 3D model, including textures for the 3D model, from the 2D images using known systems and method. In addition, further details regarding various implementations of the reconstruction process are described below, and in situations where a 3D reconstruction cannot be generated, a fallback method can involve displaying 2D images in 3D space with correct X,Y,Z coordinates on the location. Regardless of the details of the 3D reconstruction techniques, while more time periods remain 230 (e.g., all available time periods or user selected time periods), the process continues with finding 220 camera parameters and reconstructing 225 3D models to generate a 3D scene that spans different time periods. Note further that, in some implementations, one or more future time periods can also be used, such as by using source images and data from a planned renovation of a structure or area (e.g., for urban planning applications), and so the 3D experience that is generated can include future time periods.

In addition, while the example of FIG. 2 focuses on validating an image with respect to time, other image validation operations can also be performed as part of a process of creating a 3D scene. For example, some part of a scene may have changed (e.g., been destroyed) while another part of the scene has not, and both parts of the scene may appear in the same image. In some implementations, for each image, a set of masks (which can be generated manually or automatically) can be used to identify areas corresponding to different time spans. Each mask can have a time interval attached to it, and retrieving images relevant to a given date can involve retrieving any image for which there is at least a mask whose time interval includes that date. This approach can be applied to 3D input images as well. In addition, in some implementations, existing structures can be obfuscated or hidden in a rendering when those structures are not accounted for in historical images and scenes.

In any case, the complete 3D scene (e.g., two or more 3D scenes of the location of interest at two or more different times) can then be provided 235 for use in displaying (on one or more computer output devices) the location of interest from different 3D perspectives. Further, as noted above, the 3D scene can also be used to generate animations of movement around and through the 3D space of the 3D model of the object of interest, as well as movements in time, where the rendered 3D model changes over time. Thus, the generated 3D scene(s) can support animation of the location of interest on the one or more computer output devices, where the animation can show changes in both space and time. Thus, a time-lapse type video of the 3D scene over time can be generated, in which the evolution of the location is shown over potentially multiple time periods and over more than one model of the changing structures of the 3D scene.

Figure 3A:
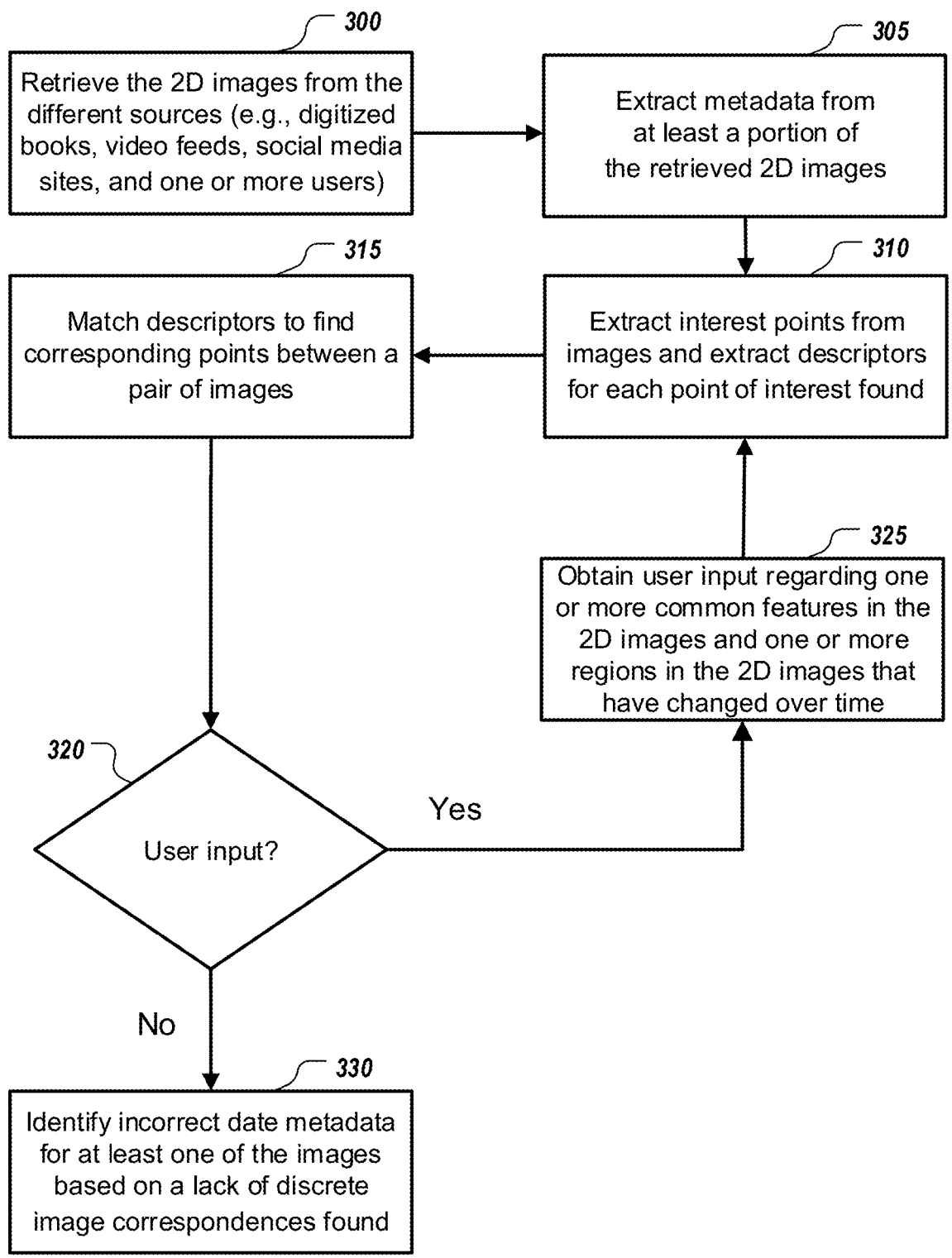
FIG. 3A shows an example of a process of retrieving and matching 2D images.

FIG. 3A shows an example of a process of retrieving and matching 2D images. The 2D images are retrieved 300 from different sources. For example, the 2D images can be retrieved from servers hosting scanned print references, video feeds, social media sites, and from one or more users (e.g., crowd sourcing the images). Metadata can be extracted 305 from at least a portion of the retrieved 2D images. This metadata can include date, GPS location, camera parameters, or a combination of these.

Interest points can be extracted 310 from images and descriptors can be extracted 310 for each point of interest found. For example, some implementations can use the systems and methods described in Bay et al., "SURF: Speeded Up Robust Features", Computer Vision and Image Understanding (CVIU), Vol. 110, No. 3, pp. 346-359, 2008. Further, descriptors can be matched 315 to find corresponding points between a pair of images. For example, some implementations can use the systems and methods described in Ni et al., "GroupSAC: Efficient Consensus in the Presence of Groupings," (2009) in 'ICCV', IEEE, pp. 2193-2200.

A check 320 can be made to determine if user input is desirable. In some implementations, user input is always sought. In some implementations, a determination is made as to whether the identified matches between images is sufficient to proceed, and if not, input can be obtained from a user to facilitate matching images and identifying correct time periods for images. In some implementations, user input is obtained 325 regarding one or more common features in the 2D images and one or more regions in the 2D images that have changed over time. This information can then be used to facilitate matching of descriptors to find corresponding points between images, as described in further detail below. Moreover, in some implementations, the images from one time period can be used to complete or infer structural information from a different time period, and the user interface can be used to show inferred structures using a different color or texture to get user input before rendering the inferred structure using the same visual rendering style as the target time period.

In addition, once the images have been properly grouped, incorrect metadata (e.g., date metadata) can be identified 330 for at least one of the images based on a lack of discrete image correspondences found between the at least one of the images and other ones of the images that have corresponding metadata. For example, an image may have an assigned date that comes from the copyright of the book from which the image was scanned, but comparisons of the image with other images can show that the image is from a much earlier time, and so the date from the book is not applicable to image found therein. For date and time verification, confidence values can be associated with each date and/or time period depending upon the source from which it comes. For example, a date found in EXIF (Exchangeable Image File)

metadata may be more likely trusted that a date found in a website, but the period of time around this date may be less trusted.

In some implementations, such confidence values can be adjusted depending upon whether the features in the images match the other images with the same date and/or time period, and the confidence values can be used to reject or accept an image for a specific date and/or time period. For example, if a first image has EXIF data indicating it comes from the year 1960, the image should be trusted with a certain confidence for 1960, but less trusted for 1959 or 1961. However, if this first image matches a second image that was taken in 1961, the confidence level for the first image can be increased with respect to its being trusted for the period 1960 to 1961, but less trusted for 1959 or 1962.

FIGS. 3B-3C show additional examples of processes of retrieving and matching 2D images. At least two sets of 2D images that share corresponding sets of discrete image correspondences are found 350. For example, an initial set of images 370 can be compared and divided into two or more sets of images 372, 374 based on the images having a threshold number of discrete image correspondences between each pair of images in the set. Note that each set of images can include images that have been found similar even though they come from different time periods.

At least one image 376, 378 from each of the at least two sets 372, 374 can be presented 352 to a user. In some implementations, a single representative image from each set is presented to the user (e.g., the image from each set having the greatest field of view of images in that set). In other implementations, more than one image from each set can be presented to the user, and the user interface can allow the user to view the images and select a representative image for each set. Further, in some implementations, the user interface can enable the user to make changes to the image sets themselves, such as by presenting images of the sets side by side and allowing a user to move images from one set to another set, allowing a user to remove images from all sets entirely, or a combination of these.

In any case, selections are received 354 from the user, where the selections can include selection of a first region of interest that is common across the presented images and a second region of interest that has changed across the presented images. For example, for each representative image presented, the user can specify a first region 380 in which key features of the location of interest can be found (e.g., the portion of a city block in which a building of interest can be seen), and the user can specify a second region 382 in which key features of the location have changed (e.g., a portion of the building that has been rebuilt). The two regions 380, 382 can be separate, can overlap, or one can fully contain the other. The two regions 380, 382 can be specified in more than one representative image from each image set, and the two regions 380, 382 can be different shapes and sizes in different images. In the example shown, the two regions 380, 382 are sown as rectangles (e.g., drawn by the user with a bounding box tool) but other shapes are possible, and such regions can be specified with known image editing user interface tools.

With the user specified information provided, the images 384 can be rechecked 356 for discrete image correspondences between pairs of the 2D images. Using the first region of interest, the amount of image data that needs to be processed to find similar images can be reduced. Moreover, using the second region of interest, images that are similar because of the time frame in which they show the object of interest can be more readily identified. For example, the 2D images can be separated 358 into the different time periods based on a number of discrete image correspondences found in the second region of interest in relation to a number of discrete image correspondences found in the first region of interest. Note that the threshold number of discrete image correspondences that are needed to identify a match can be changed when processing based on the first region and the second region. Moreover, the images that belong to each set can be changed based on this processing, resulting in final image sets 386, 388 that have been located with respect to a timeline and are ready for use in 3D reconstruction.

Reconstruction of 3D scenes can be done using known systems and methods. For example, some implementations use the systems and methods described in Hiep et al., "Towards High-resolution Large-scale Multi-view Stereo", Conference on Computer Vision and Pattern Recognition (CVPR), Miami, June 2009. Such systems and methods can be employed in combination with the systems and methods described herein.

Figure 4:
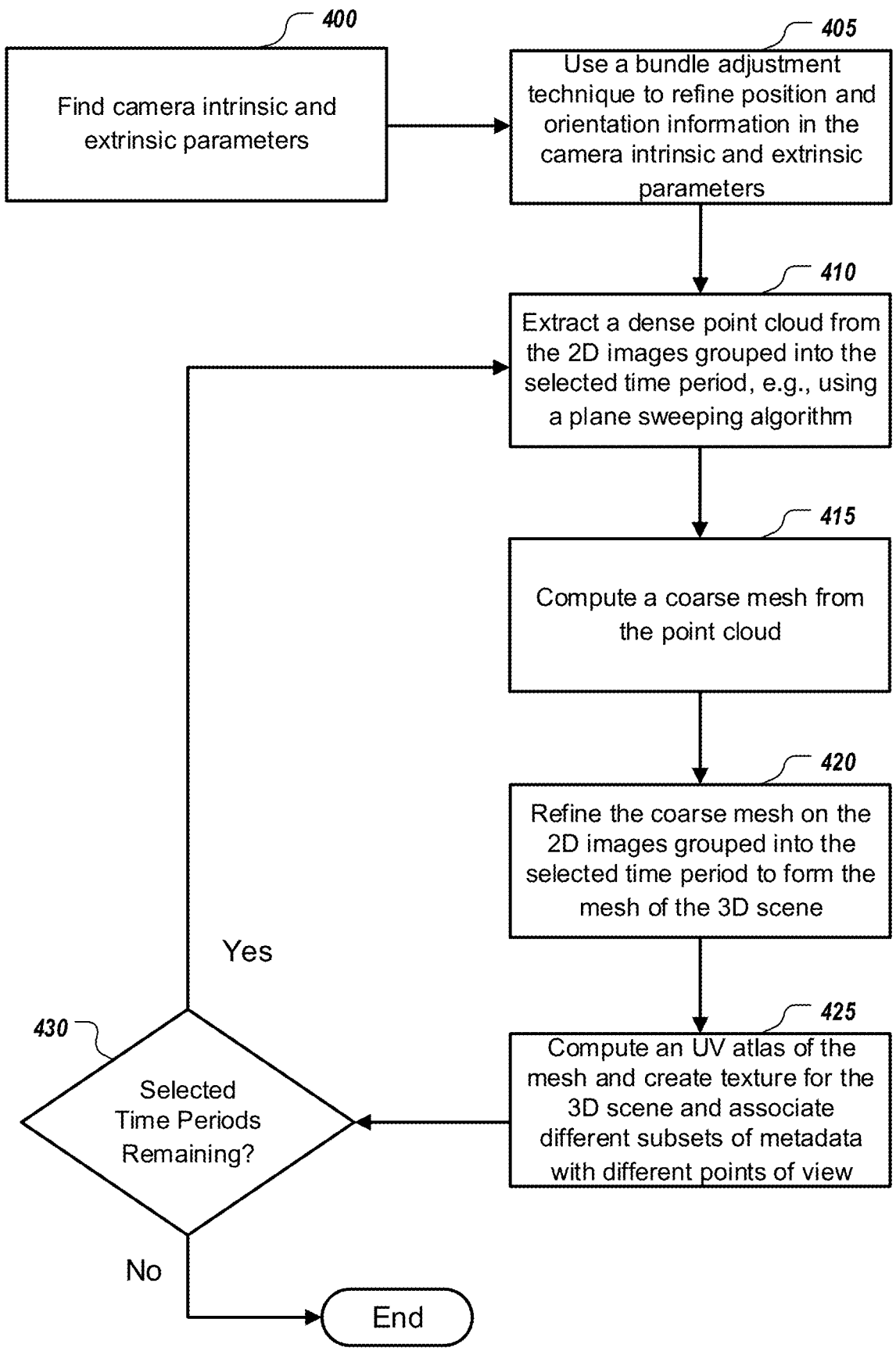
FIG. 4 shows an example of a process of reconstructing a 3D scene from 2D images.

FIG. 4 shows an example of a process of reconstructing a 3D scene from 2D images. Camera intrinsic and extrinsic parameters can be found 400. For example, some implementations can use the systems and method described in Richard Hartley and Andrew Zisserman (2003), Multiple View Geometry in Computer Vision, Cambridge University Press, pp. 155-157 (ISBN 0-521-54051-8). In addition, a bundle adjustment technique can be used 405 to refine position and orientation information in the camera intrinsic and extrinsic parameters. For example, some implementations can use the systems and method described in Triggs et al., "Bundle Adjustment—A Modern Synthesis", (1999) ICCV '99: Proceedings of the International Workshop on Vision Algorithms, Springer-Verlag, pp. 298-372 (doi: 10.1007/3-540-44480-7_21. ISBN 3-540-67973-1). Furthermore, in implementations that also use 3D images as inputs, aligning can be done by computing a rigid motion between the 3D entities (photogrammetric scene and 3D data) based on a few common 3D points. Thus, registration between 2D and 3D images can be achieved using this or other methods.

A 3D point cloud can be generated 410 from the 2D images grouped into the selected time period. For example, a plane sweeping algorithm can be used to extract a dense point cloud. A coarse mesh can be computed 415 from the 3D point cloud, using known methods, and the coarse mesh can be refined 420 on the 2D images grouped into the selected time period to form the mesh of the 3D scene. Further, an UV atlas of the mesh can be computed 425 and texture created for the 3D scene. As will be appreciated, the UV (denoting axes of the 2D texture) mapping can come from individual images in the set and/or from images that have been stitched or blended in various manners. In addition, in some implementations, different subsets of the metadata for the images (e.g., generated metadata describing a particular feature of a location, such as the West Wing of the White House) can be associated 425 with different points of view in the 3D scene.

A check can then be made 430 to see if there are more selected time periods. While there are, the process continues. Note that in some implementations, all identified time periods are processed before any output is shown to a user. In other implementations, the user can be given access to a generated 3D scene while processing to reconstruct additional 3D scenes from different time periods continues.

Figure 5:
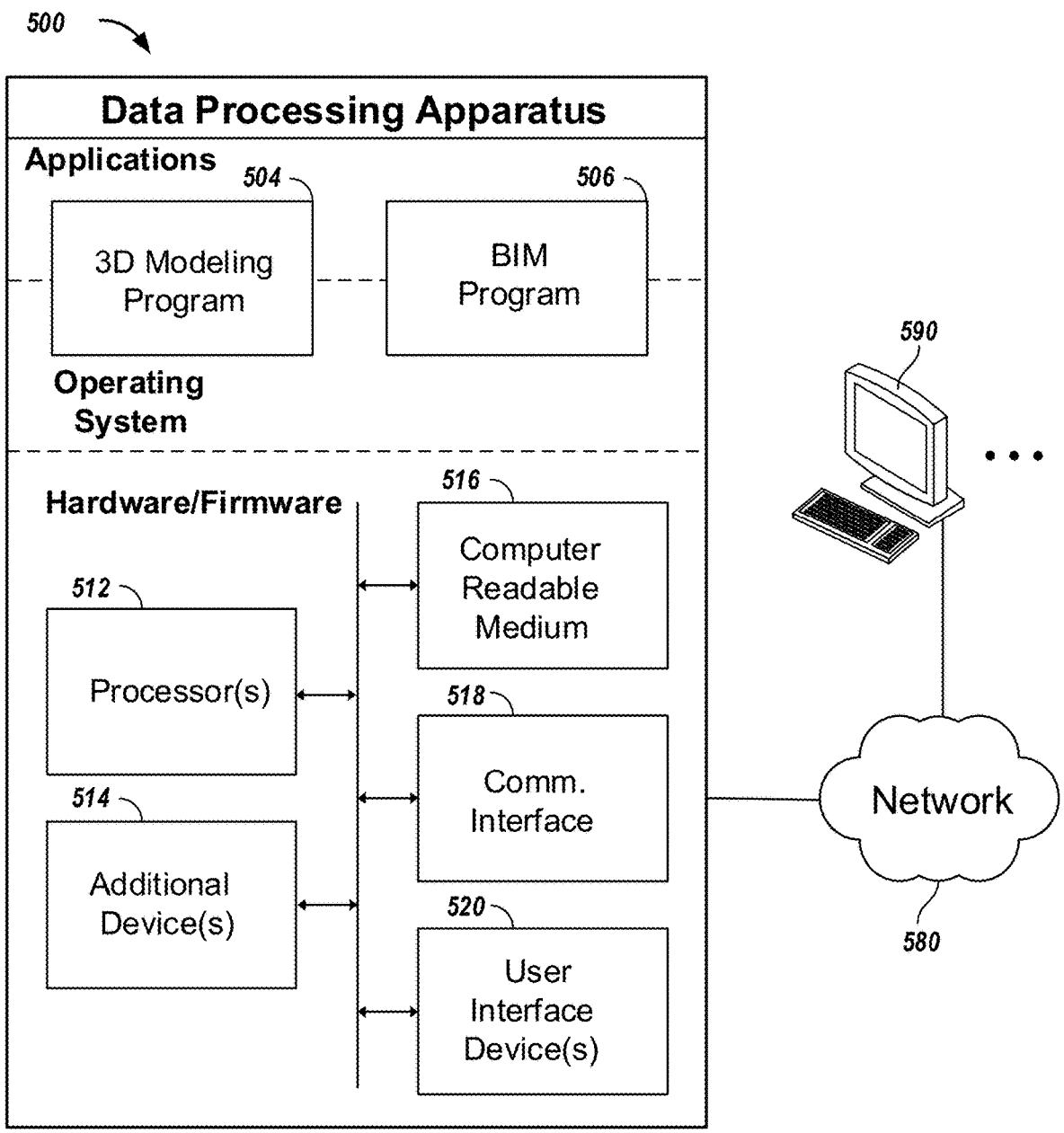
FIG. 5 is a schematic diagram of a data processing system.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling program 504 and Building Information Modeling (BIM) Program 506. The 3D modeling program 504 can implement the systems and techniques described above and variations thereof. For example, in some implementations, the 3D modeling program 504 can also include other elements in the reconstructed and rendered scenes, such as people or animal life (e.g., ancient native American tribes, dinosaurs, etc.) that match the appropriate timeframe, or output to a heads-up display (e.g., pop-ups for obtaining information interactively) that describes metadata supporting the images and models in the timeframe (e.g., narrative data meant to enhance the experience by offering coach marks, pointers, etc.).

The BIM program 506 can implement building management capabilities systems and techniques further described in connection with FIG. 6 and variations thereof. The BIM program 506 can be implemented as object-oriented building development processes with a related set of software applications that utilize multi-dimensional, digital modeling concepts, and information technology and software interoperability to design, construct and operate a building project. Regardless, of the operational details of the 3D modeling program 504 and BIM program 506, the number of software modules used can vary from one implementation to another. In some implementations, the 3D modeling program 504 and BIM program 506 can be integrated, or otherwise combined, into the same computer program. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses its communication interface 518 to communicate with one or more computers 590, for example, over a network 580. Examples of user interface devices 520 include a display, a camera, a speaker, a microphone, a tactile feedback device, a keyboard, and a mouse. The data processing apparatus 500 can store instructions that implement operations as described above, for example, on the computer readable medium 516 or one or more additional devices 514, for example, one or more of a floppy disk device, a hard disk device, an optical disk device, a tape device, and a solid state memory device.

Figure 6:
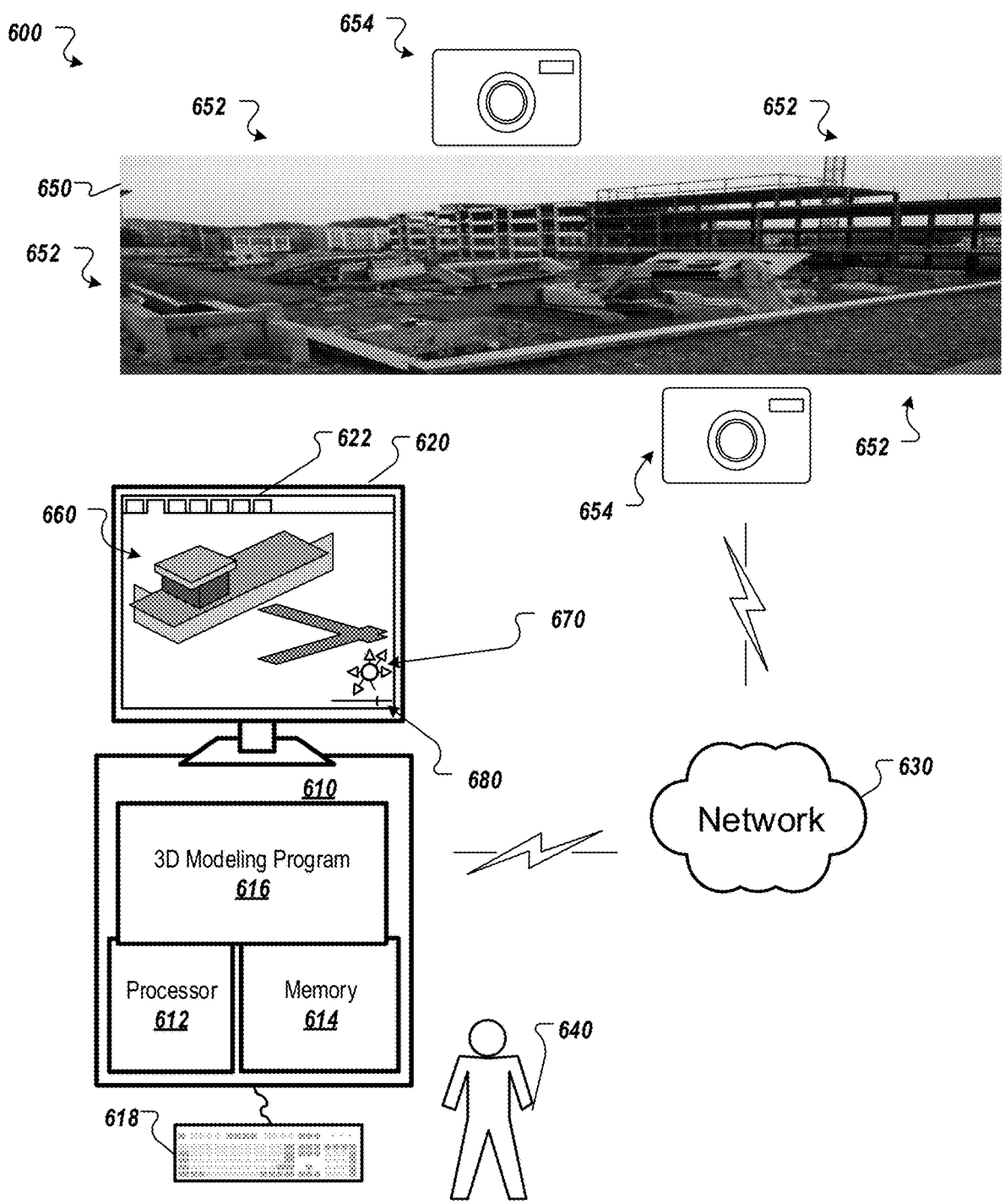
FIG. 6 shows an example of a system usable to reconstruct and display 3D modeled scenes from images of a physical site.

FIG. 6 shows an example of a system 600 usable to reconstruct and display 3D scenes from two dimensional (2D) or 3D images. As shown in FIG. 6, the system 600 includes a computer 610; a computer network 630; and one or more capture devices 654 located at two or more locations 652 about a physical site 650. The physical site 650 can be a locality of interest in the areas of construction, engineering, and/or architecture. In FIG. 6, the physical site 650 is shown as a building construction site. However, the physical site 650 can also be any location related to civil infrastructure, utility infrastructure, and design projects.

As shown in FIG. 6, the system 600 includes capture devices 654. The capture devices 654 are implemented as any suitable device, or collection of devices, capable of electronically recording, generating, or producing visual images. The capture devices 654 can include, but are not limited to: digital cameras; digital video cameras; imaging sensors; tablet computers; and various mobile computing devices with camera functionality (e.g., built-in cameras). In some implementations, the capture devices 654 can include 3D sensing devices used to generate 3D images, such as LIDAR (Light Detection and Ranging) cameras and structured light 3D cameras (e.g., the PRIMESENSE™ Kinect camera available from Microsoft Corporation of Redmond, Wash.). In the embodiments, the capture devices 654 generate visual representations, such as digital images, that are associated with a particular location of interest, for example physical site 650.

The capture devices 654 generate a collection of images at multiple locations 652, where the locations 652 can be proximately surrounding physical site 650. Thus, the capture devices 654 can be arranged about the physical site 650 so as to provide different visual perspectives of the site from differing positions and orientations that are associated with each of the locations 652. Also, multiple capture devices 654 can be specifically arranged at locations 652 in a manner that enables 3D modeling program 616 to determine spatial dimensions and location of points in the 3D space, from the respective images. For example, the capture devices 654 may be positioned at locations 652 to provide triangulation from acquired two-dimensional images and/or placed at known, static locations, thereby supporting 3D scene reconstruction of the physical site 650 from the generated images in a common coordinate system and registration space.

The capture devices 654 are configured to provide the various images, and other site data that may be deemed pertinent to the images (e.g., position, orientation, and time), to other system 600 elements for processing. In some implementations, site data includes, but is not limited to: imaging data; coordinate data of the capture device; time metadata; coordinate data of the image data; coordinate data of the physical site; registration data; project identifiers; capture device identifiers; building geometry; spatial relationships; equipment and components; and the like. For example, the capture devices 654 can transmit the produced images to computer 610, and thereby serve as source images for further processing and reconstruction of a 3D scene. According to the implementation, the capture devices 654 employ network 630 to communicatively convey the images to computer device 610. Alternatively, the capture devices 654 can use a physical connection, such as a Universal Serial Bus (USB) connection, to transmit the images and site data to computer 610. Additionally, the capture devices 654 can be directly programmed with the software necessary, such as 3D modeling program 616, to generate a 3D modeled scene from source images (e.g., independently from computer 610).

In some implementations, one or more of the capture devices 654 can be stationary, or affixed, at a particular site location 652. For instance, capture devices 654 may be components previously positioned at or near the site itself, such as surveillance cameras or closed-circuit television (CCTV) cameras, which may be located on structures around the site 650 (e.g., neighboring buildings). The images from stationary capture devices 654 may represent predetermined locations about the physical site 650. Therefore, each capture device 654, or a specified group of capture devices, can correspond to known locations surrounding physical site 650. These locations 652 can be selected, or otherwise recognized, via BIM software as observation points for construction field operations. In alternative implementations, the locations 652 are not predetermined, or otherwise previously known. For example, locations 652 can change, or can be dynamically selected, as deemed necessary.

Additionally, the locations 652 and/or the capture devices 654 are associated with coordinates that can specify their position, and the points imaged, as a spatial reference to the physical site 650. Coordinates can be expressed as either 2D or 3D Cartesian coordinates about a specified center of origin at the physical site 650. In some implementations, coordinate data associated with the capture devices 654, images produced therefrom, and the locations 652 can be conveyed using conventional position referencing systems, such as Global Positioning System (GPS) coordinates. Accordingly, the capture devices 654, the locations 652, and the images generated, can be selected or referenced by elements in system 600 using these coordinates. In some embodiments, the coordinate data corresponding to source images is included in the site data.

The capture devices 654 can be configured to store, and communicate, identification data employable to uniquely identify the devices associated with images, locations 652, or physical site 650. For example, each capture device 654 of the system 600 can include a serial number that can be transmitted to, and subsequently employed, by the BIM software and/or 3D modeling program 616, to perform certain functions. In some implementations, an interface is provided to a user 640 to control, or otherwise program, functions of the capture devices 654 (e.g., power on, power off, focus, capture image). For instance, the capture devices 654 can be programed to automate imaging, and capture images at predetermined capture times. The capture times can be synchronous, thereby enabling capture devices 654 to take images at certain, common time intervals (e.g., hourly, daily, bi-monthly, etc.). Moreover, capture times employed by capture devices 654 can be asynchronous, such as independently specified dates and/or times or immediately after selection by a user 640 (e.g., "on-demand" image capturing).

In some implementations, a computer 610 is located locally in respect to physical site 650. Alternatively, the computer 610 can be remotely located, but communicatively accessible at the physical site 650 via another communication device, for example a mobile device. The computer 610 includes a processor 612 and a memory 614, and the computer 610 can be communicatively connected to a computer network 630, which can be a private network, a public network, a virtual private network, etc. The processor 612 can be one or more hardware processors, which can each include multiple processor cores. The memory 614 can include both volatile and non-volatile memory, such as Random Access Memory (RAM) and Flash RAM. The computer 610 can include various types of computer storage media and devices, which can include the memory 614, to store instructions of programs that run on the processor 612.

Such programs include a 3D modeling program 616, which operates locally on computer 610. In some implementations, the 3D modeling program 616 can be transferred to the computer 610 and other computing devices for use. The 3D modeling program 616 can be configured for downloading, for example, and subsequently executed on other computers in communication with the network 630, the computer 610 itself, or on a combination of each of the preceding. Thus, in some implementations, the 3D modeling program 616 can reside on another computer, for instance a third party server system, remotely located from computer 610 and accessible via a computer network.

The 3D modeling program 616 presents a user interface (UI) 622 on a display device 620 of the computer 610, which can be operated using one or more input devices 618 of the computer 610 (e.g., keyboard and mouse or touch screen). Note that while shown as separate devices in FIG. 6, the display device 620 and/or input devices 618 can also be integrated with each other and/or with the computer 610, such as in a tablet computer.

The 3D modeling program 616 is programmed to generate and reconstruct 3D scenes, for example 3D scene 660, using various source images. According to the embodiments, multiple source images, such as 2D images and 3D scans, are obtained by the 3D modeling program 616. The 3D modeling program 616 is configured to process the source images as imaging data used in creating a 3D reconstruction of the source images. The 3D modeling program 616 can employ known systems and techniques for generating a digital 3D scene 660 from multiple 2D images or multi-dimensional scans.

As shown in FIG. 6, a digital 3D scene 660 of a particular location of interest, such as physical site 650, can be generated. The 3D modeling program 616 is configured to reconstruct 3D scene 660 from multiple source images that can represent differing visual perspectives of the physical site 650. The 3D modeling program 616 can be programmed to receive, or otherwise obtain, images of multiple locations 652 about the physical site 650. For instance, the images can be a collection of digital photographs captured by multiple digital cameras 654 positioned at one or more of the locations 652. The 3D modeling program 616 is further operable to, thereafter, combine these images corresponding to at least two of the respective locations 652 to reconstruct the images into 3D visualizations, such as a 3D scene 660.

In some embodiments, reconstructing a 3D modeled scene from source images can include extracting a dense point cloud, from 2D images, for example, that are grouped into a time period as described in connection with FIG. 4. For example, a plane sweeping algorithm can be employed to extract the dense point cloud. In such implementations, a 3D scene reconstruction performed by the 3D modeling program 616 can further include: computing a coarse mesh from the 3D point cloud; refining the coarse mesh on the 2D images grouped into a time period to form a mesh of the 3D scene; and computing a UV atlas of the mesh and creating texture for the 3D scene.

In some implementations, 3D modeling software 616 is programmed to generate the reconstructed 3D scenes as output to be displayed using any display device deemed appropriate for presenting 3D visualizations. Therefore, a display device of the embodiments is implemented to appropriately show characteristics pertinent to realizing 3D modeling, such as conveying depth. For example, 3D scene 660 is made viewable to a user 640 via the display device 620. 3D scene 660, as shown in FIG. 6, is configured to be presented as output within UI 622. Alternatively, a 3D scene 660 can be generated as output, from UI 622 and/or display device 620 to be displayed at a peripheral device used in conjunction with computer 610, such as 3D stereo display glasses.

In some implementations, the 3D modeling program 616 additionally functions to associate at least one time element to a reconstructed 3D scene. The 3D modeling program 616 can be designed to obtain and determine differences in time periods associated with the input images, and group these images according to time period. In some implementations, the input images are obtained by the 3D modeling program 616 with corresponding time metadata, such as time stamps.

The 3D modeling program 616 is programmed to employ the aforementioned time metadata for reconstructing 3D scenes specifically associated with a selected time. For example, the 3D modeling software 616 of the embodiments is capable of reconstructing a time discrete 3D scene representing a selected point of time (e.g., day) during the lifecycle of a construction project. In some implementations, the 3D modeling program 616 retrieves 2D images from groups of images corresponding to a time as the source images used to reconstruct a 3D scene based on time elements.

In some implementations, the 3D modeling program 616 functions to reconstruct a series of time discrete 3D modeled scenes. Accordingly, the 3D modeling program 616 has the capability to generate multiple 3D representations of the physical site 650, for example, over distinct time periods. Additionally, FIG. 2 shows an implementation performing reconstruction of a 3D scene of a location of interest during a selected time period. For instance, 3D modeling program 616 can generate a series of 3D modeled scenes, where each respective 3D scene in the series corresponds to images captured at a time interval (e.g., weekly) within the time selected time period (e.g., 3 months). It should be appreciated that the 3D modeling program 616 of the embodiments may advantageously manipulate time elements to "time sliced" 3D scenes further employed to show the changes, or development, of a site over time.

As shown in FIG. 6, at least one 3D scene in a series of time discrete 3D scenes is configured to be displayed by the computer 610. In some implementations, the UI 622 includes another UI element 680 that allows the user 640 to enter user input, such as scrolling or swiping. In response to the user input, the UI element 680 traverses through a time axis and displays various time discrete 3D scenes 660 associated with the physical site 650. Therefore, a user 640 can employ the UI element 680 and display 620 to view a series of reconstructed 3D scenes chronologically over a selected time period, for example. Additionally, in some embodiments, the UI element 680 can be employed to move forward and back in time, and can therefore support viewing a reverse chronological order in a series of time discrete 3D scenes. In addition, the UI 622 can include a UI element 670 that allows the user 640 to rotate and translate the view into the 3D space, thus displaying the 3D reconstruction of the physical site 650 from many different points of view (camera view location plus camera view angle). In some implementations, UI elements 670 & 680 are combined.

In some implementations, the UI 622 provides an additional interface allowing a user 640 to submit a request to display a particular 3D scene or series of 3D scenes. A user 640 can input one or more specified parameters, data, or metadata associated with the desired 3D scenes using the additional interface of UI 622. Suitable parameters for requesting 3D scenes can include positions, orientations, coordinates, times, or any combination thereof. For example, 3D scenes corresponding to coordinates X, Y, Z that are associated with physical site 650 can be specified in a user request entered via UI 622. In some implementations, requests for displaying reconstructed 3D scenes are automated and can be generated automatically by associated BIM system functions. It should be appreciated that the embodiments provide the information relationships necessary for integration within the construction field operations of BIM tools.

In response to receiving a user request from UI 622, the 3D modeling program 616 is further programmed to retrieve the appropriate 3D scenes for display. In some implementations, the 3D modeling program 616 is designed to perform identification, matching, and grouping of reconstructed 3D scenes based on various parameters, for example time (as shown in FIG. 2). Therefore, UI 622 functions in concert with 3D modeling program 616 to request, retrieve, and display specified 3D scenes according to corresponding parameters.

Furthermore, the 3D modeling program 616 is programmed to create animations of movement in the 3D scene, which can include movement in the 3D space (e.g., orientation and position) and/or movement in time, where the textures placed on the 3D model of the location can be blended together for the transition from one time period to another. In some implementations, the 3D modeling program 616 is designed to let the user 640 specify paths in 3D space and time transitions, from which the 3D modeling program 616 can then generate an animation to be displayed via UI 622.

In some implementations, the UI 622 supports a superimposed display of one or more reconstructed 3D scenes. The UI 622 is configured to display a 3D scene onto another 3D scene sharing the same coordinate system, for example, to produce on overlay effect. Additionally, the 3D modeling software 616 can be designed to generate 3D scenes with aspects of transparency, in such manner that the images can be displayed and viewed as a superimposed onto other displayed 3D scenes, images, or real-time imaging. For example, semitransparency tools can be used for creating overlays of the 3D visualizations.

Moreover, the 3D modeling program 616 can be configured to perform the image analysis necessary to implement the superimposition of 3D models, according to the embodiments. The 3D models can be analyzed so as to suitably determine the position of the scenes relative to a coordinate system of the physical site. For example, non-coplanar points may be used to extrapolate positioning and/or orientation information within the reconstructions. Thus, known positioning of the 3D visualizations can be used for alignment of the reconstructions in an overlayed 3D scene. Furthermore, various algorithms and mechanisms that can be used to better achieve 3D image superimposition, such as image translation, rotation, synchronization, and scaling can be implemented by 3D modeling program 616, as deemed appropriate.

The computer network 630 may be implemented as either a wired network (e.g., Ethernet) or a wireless network. Examples of computer networks include, but are not limited to, a local area network (LAN), a wide area network (WAN), and the Internet. In an embodiment, the computer network 630 is a wireless network so that devices local to the physical site 650 can communicate, or otherwise transmit, data wirelessly. The computer network 630 may be a wireless local area network (WLAN), such as an IEEE 802.n network. Thus, computer 610 and capture devices 654 are communicatively coupled, and capable of the wireless transmission of imaging data, for example, via the computer network 630.

Figure 7:
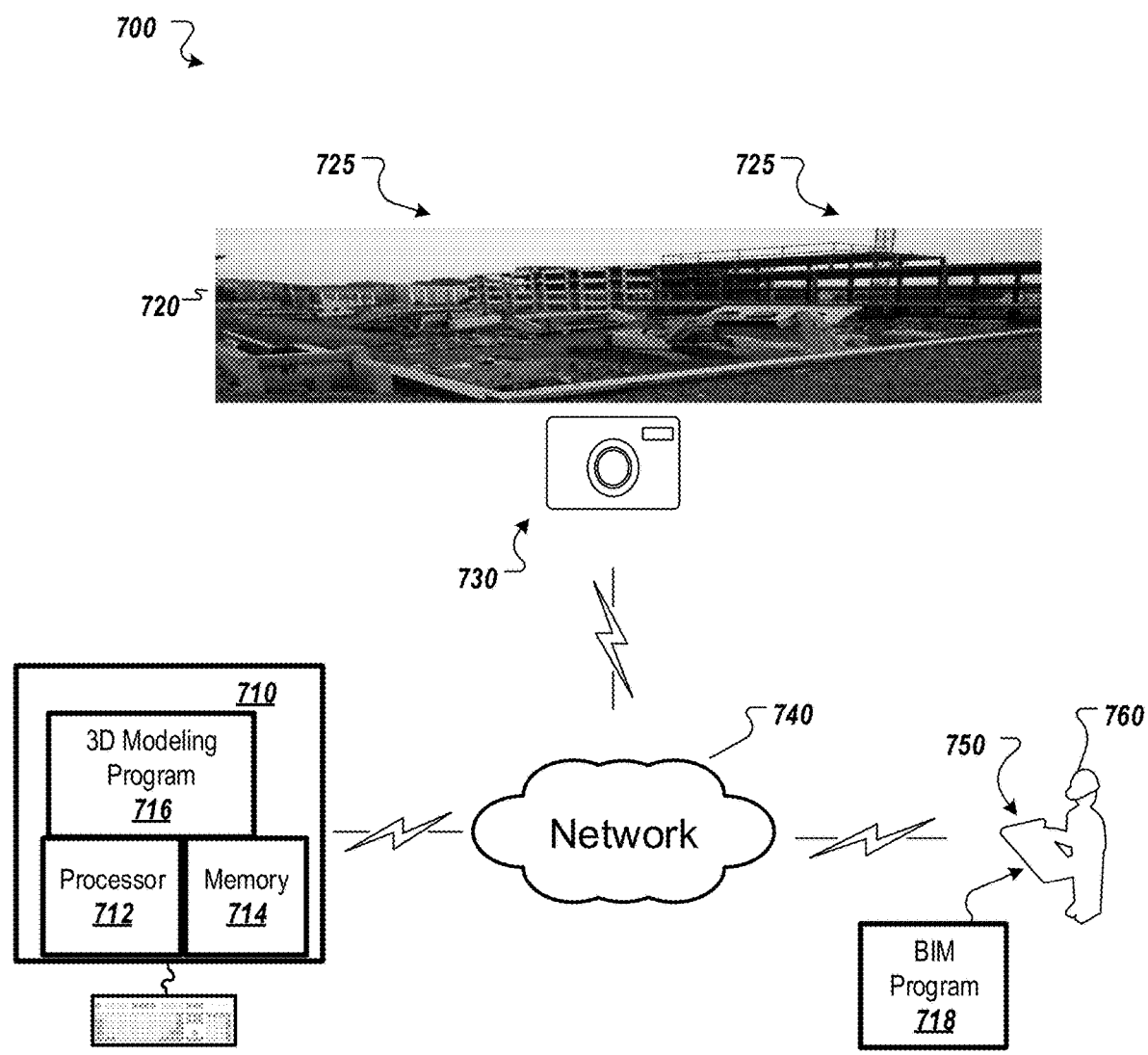
FIG. 7 shows another example of a system usable to reconstruct and display 3D modeled scenes from images of a physical site.

FIG. 7 shows an example of a system 700 usable to reconstruct and display 3D scenes from 2D or 3D images. The system 700 includes: a computer 710; a computer network 740; a mobile device 750 employable by a user 760;

and a capture device 730 that can be positioned at two or more locations 725 about a physical site 720. According to the implementation, the capture device 730 can be implemented as a portable, mobile, or handheld device with the capability to be moved, or be otherwise repositioned, at the locations 725 around physical site 720. As an example shown in FIG. 7, the capture device 730 is implemented as a portable digital camera. The capture device 730 can be implemented as any suitable device capable of producing 2D images or 3D scans of the physical site 720.

In some implementations, a user at the physical site 720 can manually relocate the capture device 730 to various locations 725, as desired, in order to capture a plurality of visual perspectives about the physical site 720. As shown in FIG. 7, one capture device 730 is employed to generate a collection of source images from multiple locations 725. Therefore, the system 700 may require fewer dedicated components for images, namely capture devices 730, for realizing the embodiments.

In an embodiment, the capture device 730 is implemented as a self-mobile (e.g., motorized) vehicle with imaging capabilities. The imaging capabilities for a self-mobile capture device 730 imaging device can be integrated into the components of the vehicle, or implemented as a peripheral device coupled to a vehicle, for example. Utilizing a self-mobile capture device 730 may be desirable for unstable environments, such as dangerous construction zones. For example, a self-mobile capture device 730 can be employed in instances where the conditions of a physical site 720 are hazardous to humans, or not suitable for use of sensitive imaging equipment.

In some implementations, capture device 730 can be an unmanned aerial vehicle, such as a drone, equipped with both imaging and flying capabilities. Thus, a self-mobile capture device 730 can be positioned so as to provide images at aerial or high latitude locations 725. Alternatively, the capture device 730 can be implemented as an automated motor, or land traversing, vehicle such as a robotic rover. The capture device 730 can be controlled, or otherwise operated, by a user 760 located at the physical site 720. Thus, the mobile device 750 can be configured to run software necessary for command and interface capabilities associated with a self-mobile capture device 730 in the embodiments.

In one or more implementations, the self-mobile capture device 730 is programmed to automatically travel to defined locations 725, such as a predetermined flight path, around physical site 720. Therefore a user, for example user 760, is not required to be physically present at the physical site 720 for controlling or repositioning the self-mobile capture device 730 to the various locations 725.

Site management operations, such as those supported by BIM program 718 tool may require tailored "on-demand" imaging, including images taken from differing, or previously unexpected, locations of interest. It should be appreciated that the implementation, as displayed in FIG. 7, can provide dynamic capabilities that may better accommodate interoperability with BIM program 718 functions, for example site management. According to the embodiments, locations 725 are not required to be statically predetermined or associated with stationary cameras. Consequently, the increased dynamic capabilities may further increase the flexibility and ease of use with the BIM program 718 tools.

The computer 710 of system 700 is shown to include a processor 712 and a memory 714, and the computer 710 can be communicatively connected to a computer network 740, which can be a private network, a public network, a virtual private network, etc. The processor 712 can be one or more hardware processors, which can each include multiple processor cores. The memory 714 can include both volatile and non-volatile memory, such as Random Access Memory (RAM) and Flash RAM. The computer 710 can include various types of computer storage media and devices, which can include the memory 714, to store instructions of programs that run on the processor 712.

The programs can include a 3D modeling program 716, which operates locally on computer 710. The 3D modeling program 716 is programmed to generate and reconstruct 3D scenes using various source images from capture device 730. The 3D modeling program 716 can reconstruct a series of 3D scenes of the physical site 720, and generate an output of the 3D visualizations for display at a portable device. For example, the computer 710 can transmit the 3D modeling program 716 output to mobile device 750, thereby allowing a user 760 to view the resulting 3D modeled scenes.

FIG. 7 shows the system 700 including a mobile device 750. The mobile device 750 can be implemented as a wireless computing device, such as, but not limited to, a tablet computer, a laptop computer, or a mobile phone. Accordingly, the system 700 supports a wireless-based architecture for implementing the imaging, 3D reconstructing, and display capabilities of the embodiments. In some implementations, the mobile device 750 is local, or proximately located, to the physical site 720. Thus, the mobile device can be employed by a user 760 located at the physical site 720, such as a construction manager.

The mobile device 750 is connected to computer network 740. Thus, the mobile device 750 is configured to communicate with the computer 710 via the computer network 740. Furthermore, the mobile device 750, through a connection to computer network 740, can communicate with the capture device 730. In the wireless network implementation displayed in FIG. 7, the user 760 can employ the mobile device 750 to transmit to and/or receive data from the capture device 750.

FIG. 7 displays that mobile device 750 is configured to execute BIM program 718, so as to provide building management capabilities. Mobile device 750 can be used to realize tracking and monitoring of the evolution of the physical site 720, for example, over time using applications of the BIM program 718 in a 3D environment (e.g., 3D reconstructions). The BIM program 718 can be implemented as object-oriented building development processes with a related set of software applications that utilize multi-dimensional, digital modeling concepts, and information technology and software interoperability to design, construct and operate a building project.

BIM program 718 supports viewing and communicating project details including building geometry, spatial relationships, performance information, geographic information, and quantities and properties of building assemblies, systems, equipment and components to numerous persons associated with a construction project. The BIM program 718 may be employed by a user 760 at physical site 720, for example, to increase productivity in building design, construction and operations of the site.

According to the embodiments, BIM program 718 tools are designed around graphic-based representations, specifically 3D visualizations, of a physical site 720 during the lifecycle of a building project. Additionally, BIM program 718 is designed to employ time-based elements that are often related to performing construction field operations and utilized in project development. The mobile device 750 can be employed to view time-discrete 3D scenes in cooperation with BIM program 718 tools, and thereby enable a construction field manager to monitor the development of a construction site over time.

In some implementations, the mobile device 750 is used to request and display reconstructed 3D modeled scenes, as generated by the 3D modeling program 716. The mobile device 750 can receive input from a user 760 to generate a request for a 3D modeled scene. The mobile device 750 includes various input devices, such as a touch screen display, for receiving input from a user 760. Additionally, the mobile device 750 is configured to use one or more built-in motion sensors, for example an accelerometer, to detect physical movement. Therefore, the mobile device 750 can receive motion-based input. In one or more implementations, position and/or orientation data for requesting a reconstructed 3D scene can be generated by the motion, or physical movement, of the mobile device 750. For instance, a user 760 can move the mobile device 750 to the right, for example, to indicate an orientation to the right of the physical site 720. Thus, a perspective discrete 3D model can be displayed corresponding to the perspective indicated by the motion-based input. Moreover, the mobile device 750 can include one or more additional input devices (e.g., keyboard) that are incorporated with or peripheral to the mobile device 750 itself.

The mobile device 750 includes a display device (e.g., display screen) configured to present the various UI modules as described in connection with FIG. 6. Thus, the mobile device 750 can be used to implement the 3D reconstruction display capabilities of display device 620, as shown in FIG. 6. UI modules related to BIM program 718 can also be presented by the display of mobile device 750. The mobile device 750 can further display 3D reconstructions integrated into BIM program 718 tools. The mobile device 750 is configured to display 2D images and 3D visualizations.

According to the embodiments, the mobile device 750 is further configured to perform an image-based localization with respect to an environment, for example the physical site 720. The mobile device 750 can determine its location by employing images of the environment, namely 3D reconstructions created by 3D modeling program 716. Localization of the mobile device 750 may subsequently result in increased accuracy of 3D visualizations related to positioning of the display device, such as in augmented reality (AR). In some implementations, the mobile device 750 can download a 3D modeled scene representing a current, or real-time, structure of the physical site 720. Alternatively, the mobile device 750 can employ several time discrete 3D reconstructions of the physical site 720 over time for localization.

Localization, according to the embodiments, includes positioning the mobile device 750 to be aligned with a common coordinate system with a downloaded 3D reconstruction, so as to determine a location of the mobile device 750 in reference to the physical site 720. The mobile device 750 can further utilize internal sensors, for example GPS sensors, to provide additional positioning capabilities working in concert with the image-based localization mechanisms. Any appropriate image-based localization algorithms or process deemed appropriate may be employed for implementing the localization feature of the embodiments.

In some implementations, the mobile device 750 allows displaying combined 3D visualizations. For example, a time discrete 3D reconstruction can be downloaded from computer 710, or otherwise transmitted, to mobile device 750. The mobile device 750 can include camera functions that support live imaging of the physical site 720. Accordingly, the mobile device 750 displays a time discrete reconstructed 3D scene as superimposed onto another 3D scene, such as a currently live scene of physical site 720. Moreover, in some implementations, the mobile device 750 is configured to display a 3D scene onto another visual representation (i.e., 2D image or 3D scene) sharing the same coordinate system, for example, to produce on overlay effect. Additionally, the 3D modeling program 716 can be designed to generate 3D scenes with aspects of transparency, in such manner that the images can be displayed and viewed as superimposed onto other displayed 3D scenes, images, or real-time imaging.

Moreover, in some implementations, BIM program 718 tools support displaying various 3D representations of multiple project environments at mobile device 750. For example, 3D reconstructions of projects corresponding to different physical sites can be displayed together at the mobile device 750, in the embodiments. The BIM program 718 is employed to register a construction filed environment, for instance physical site 720, to a project. The project can be implemented as a data set associated with the physical site 720. Similarly, according to the implementation, additional sites can be registered and associated with respective projects. The data sets correspond to each project, and include the specific image data and additional site data associated with the registered site.

Also, registering can further include registering images generated for each project in the 2D environment, for example, such that resulting 3D reconstructions are aligned to a common coordinate system consistent across the differing projects. Consequently, 3D modeled scenes for the projects can be viewed simultaneously, such as generating a superimposed view of a 3D reconstruction of a project onto a 3D reconstruction of another project. In a BIM implemented construction field operation, the embodiments can utilize 3D reconstructions to compare the progression of different instances for similar projects occurring at different sites.

In some implementations, a user 760 employs mobile device 750, for example, to enter additional data to be associated with 3D modeled scenes. The additional data can be implemented as user input, such as annotations or tags, entered by a user at the mobile device 750 while displaying a 3D modeled scene. Alternatively, the additional data can be entered at the mobile device 750 independently from viewing a 3D modeled scene. In this instance, the additional data is entered in a UI of the mobile device 750 with data to appropriately correspond the user input to a 3D modeled scene, such as a project identifier. The additional data can be used to supplement the site data maintained by the embodiments, and can reflect user specific details or notes of the physical site 720, for example. Subsequently, in the implementation, the additional data can be created, read, loaded, and saved as metadata directly corresponding to 3D scenes, thereby providing information rich visualizations or 4D models. The additional data, in some implementations, can be stored and maintained by a storage device or repository, such as a database, that can be communicatively accessible via computer network 740.

Figure 8:
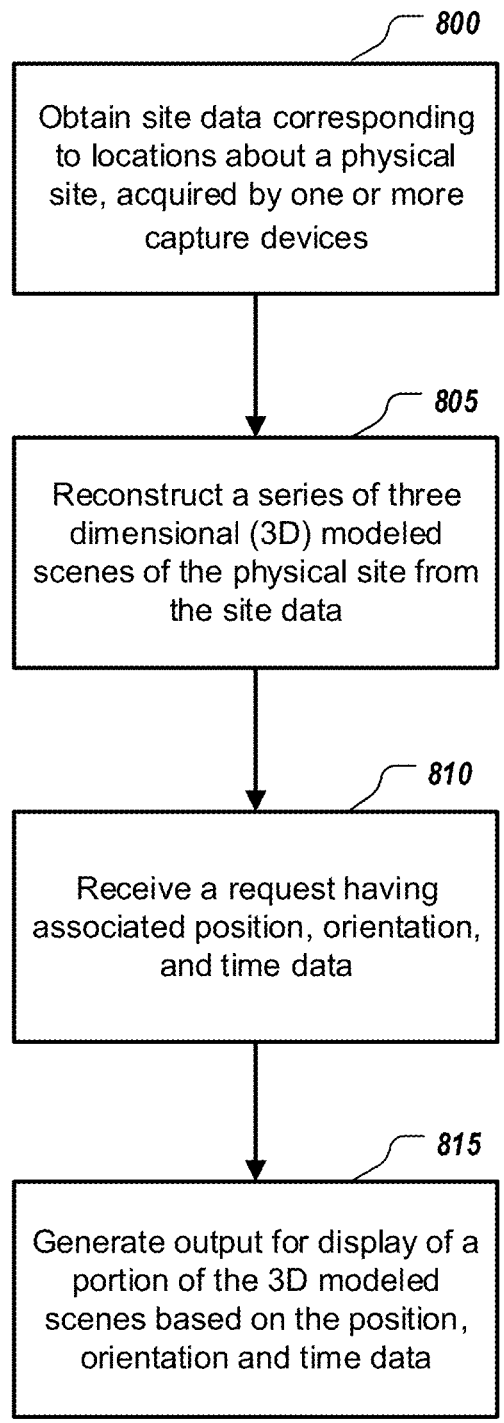
FIG. 8 shows an example of a process of reconstructing and displaying 3D modeled scenes from images of a physical site.

FIG. 8 shows an example process for reconstructing and displaying 3D modeled scenes from images of a physical site. The site data, including images, correspond to locations about a physical site and are obtained 800 from one or more capture devices. This can involve transferring the site data from the one or more capture devices, via a computer network, to be obtained by a computer programmed for generating 3D scenes. Capture devices can be arranged to be positioned at two locations, for example, around the physical site. In some implementations, cameras are statically placed at locations in the vicinity of the physical site.

The site data includes images generated by cameras, for example, and additional metadata, such as text-based data. The images produced by the capture devices can be 2D images, 3D scans, or both. The metadata can include coordinate data (e.g., GPS coordinates), time metadata (e.g., timestamps), camera parameters, or a combination of these. According to some implementations, the site data is maintained in data structures and/or data sets, in any device deemed suitable for storage, such as a storage server. Therefore, images, metadata, and generated 3D reconstructions, can be linked with, or otherwise represented as, data sets. The site data can be collected from each of the capture devices as source images for further image processing of the images, and data processing of the data sets, respectively. In some implementations, the static positioning of the cameras around the physical site results in images, captured by the same cameras, sharing an orientation in the same coordinate system. Therefore, according to the embodiment, multiple images corresponding to the same location over time can be aligned for a reconstruction of the physical site as a 3D visualization, according to the embodiments.

The site data is employed to reconstruct a series of 3D modeled scenes 805 of the physical site. Accordingly, the site data is processed by a computer, e.g., executing a 3D modeling program, to generate the 3D models. In the implementation, the series of 3D modeled scenes can be generated based on a grouping of the obtained source images. For example, time metadata for the images is analyzed to group images into differing time periods, as displayed in FIG. 2. Based on the time element, the resulting 3D modeled scenes can represent various perspectives, captured by statically placed cameras, for example, at differing times in the same coordinate system (e.g., with reference to the site environment). Therefore, each 3D modeled scene in the reconstructed series can correspond to a "time-sliced", or time discrete, 3D visualization of the physical site over a period of time. As an example, a series of 3D modeled scenes can be reconstructed for the physical site for a time period raging from January 15-June 15 (e.g., 6 months), for example.

Moreover, in some implementations, image grouping is based on one or more additional site data parameters, such as coordinate data. Therefore, the various scenes in a series can represent 3D visualizations characterizing specified positions and/or orientations in the reference coordinate system. Furthermore, the 3D modeled scenes can be associated with the site data, for example maintaining data sets that correspond to the 3D modeled scenes.

Thereafter, a request is received 810 having one or more associated parameters, such as position, orientation, and time. In some implementations, the request is generated via a UI supported by a BIM program tool, for example. Thereafter, the request can be received and processed by a computer used for searching and/or retrieving generated 3D modeled scenes. According to one or more implementations, the 3D modeling program is designed to receive and process such requests. The parameters included in a request can correspond, either by a direct relationship or an inferred relationship, to the site data associated with source images and their 3D reconstructions. Thus user requests have parameters which specify at least a portion, or a particular scene, in a series of 3D modeled scenes. As an example, a request can be received including a time, for example the date April 15, which corresponds to a time within the generated series of 3D modeled scenes.

Subsequently, an output is generated for displaying a portion of the 3D modeled scenes 815 based on the position, orientation, and time data of the request. In some implementations, the output is generated by a 3D modeling program and transmitted to an appropriate device for displaying 3D visualizations, such as mobile device 750 shown in FIG. 7. For example, a reconstructed 3D modeled scene can be downloaded by a mobile device for subsequent display and viewing by a user at the physical site. Accordingly, displaying outputs of 3D modeled scenes can be implemented using any display mechanism as discussed regarding the output devices, as shown in FIG. 6 and FIG. 7.

The generated output can include a time discrete 3D scene corresponding to the requested time, as indicated by the user input. The parameters of the request can be used to facilitate a matching between the request and the corresponding 3D reconstructions. The output can include a 3D modeled scene from the images captured on, or otherwise having time metadata associated with, the requested date (e.g., April 15). Additionally, data associated directly with the 3D reconstruction can be employed to determine an appropriate 3D modeled scene for output.

In some implementations, the request is used to output a 3D modeled scene representing a current state of the physical site. The current 3D modeled scene can be implemented as the most recently reconstructed 3D scene. A most recent 3D reconstruction can be determined based on the time metadata. Alternatively, a request for a current 3D modeled scene can effectuate the generation of an "on-demand" 3D reconstruction, from images captured substantially immediately after receiving the request. According to the embodiments, a time discrete 3D visualization of the site can be reconstructed that may characterize the development of the physical site at a particular point in time, or "time slice", within and 3D environment. Thus, the implementation can realize a time-based monitoring of a physical site.

Figure 9A:
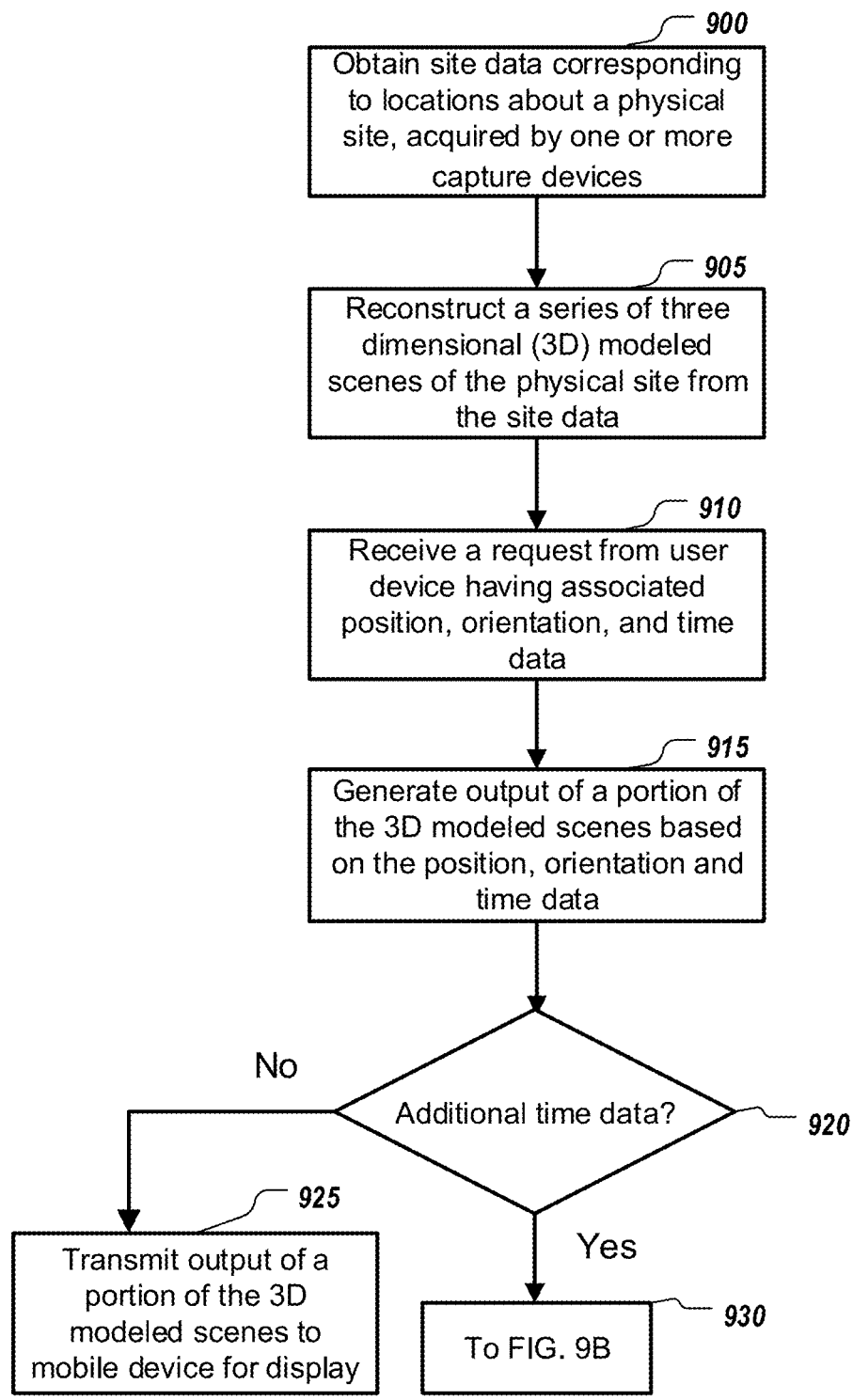

As shown in FIG. 9A, a process of reconstructing and displaying time discrete 3D modeled scenes from images is implemented. Obtaining site data corresponding to locations about a physical site 900 is performed, where the site data is acquired by one or more capture devices. This can involve communicating the site data, including 2D images for example, from the one or more capture devices to be obtained by a computer programmed for generating 3D modeled scenes.

Thereafter, a series of 3D modeled scenes are reconstructed 905 of the physical site from the obtained site data. Reconstructing 3D modeled scenes, in the implementation, can include data and image processing of the site data by a computer. In some implementations, a computer is programmed for executing a 3D modeling program utilized in generating the 3D models from the site data.

Subsequently, a request is received 910 having one or more associated parameters, such as position, orientation, and time. These request can be user generated via a mobile device, for example. In an alternative implementation, the request is generated as an automated query, particularly where a computing element of the embodiments automatically generates the request and populates the parameters. In some implementations, the request is generated via a UI supported by a BIM program tool, for example.

In response to the request, an output is generated for displaying a portion of the 3D modeled scenes 915. The output can be generated to include particular 3D modeled scenes from the series of 3D modeled scenes that are grouped, or otherwise determined to match parameters specified in the request (e.g., position, orientation, and time). In some implementations, the output is generated by a 3D modeling program and transmitted to an appropriate device for displaying 3D visualizations, such as mobile device 750 shown in FIG. 7.

A check 920 can be made to determine whether additional time has been requested. In the embodiments, the 3D modeling program is configured to iteratively generate two or more time discrete outputs for display. In the instance where additional time data is determined to be present, the process proceeds 930 to steps further displayed in FIG. 9B. The additional time data, for example, can be presented in an initial request, or transmitted in or more additional requests obtained by the embodiments. Alternatively, once it has been determined that no additional time data is present, the generated output including the portion of specified 3D modeled scenes 925 is conveyed to an appropriate device to be displayed. As shown in FIG. 9A, the generated output of the portion of the 3D modeled scenes is transmitted 925 to a mobile device to be displayed.

In FIG. 9B, the implemented process can include generating multiple time discrete outputs 935 of a portion of the 3D modeled scenes, based on the obtained additional time data. According to some implementations, the multiple 3D modeled scenes can be output based on a request including additional time data, such as a time period. As an example, a request is received including a time period raging from March 15-April 15 (i.e., 1 month), which corresponds to a time period within the series of previously generated 3D modeled scenes in the abovementioned example (e.g., January 15-June 15).

FIG. 9C further illustrates the output generated according to the embodiments. As shown in FIG. 9C, a time discrete output 950 is generated by the embodiments, which is a 3D visualization of a physical site at a $Time_1$. According to some implementations, multiple time discrete outputs can be generated corresponding to the additional time data in a specified time period, for example. FIG. 9C displays the multiple time discrete outputs 950 and 955 that can be time discrete portions from a series of 3D reconstructions of the physical site. Time discrete outputs 950 and 955 are shown to be generated for a requested time period including a start $Time_1$ and up to a $Time_N$, respectively. Each generated time discrete output corresponding to times falling between $Time_1$ and $Time_N$ can include a time discrete 3D scene that corresponds to each period of a synchronous capture time. As an example, the outputs between 950 and 955 can include a 3D reconstruction generated each week during the specified time period (e.g., reconstruction of images captured weekly). Alternatively, the time discrete outputs can include any available 3D modeled scenes corresponding to asynchronous capture times within the requested time period.

Moreover, in some implementations, the 3D modeling program can be programmed to receive any suitable additional request data. Additional request data that can include parameters employed to reference source images and the reconstructed 3D scenes, such as position and/or orientation data. Therefore, the 3D modeling program is also configured for iteratively generating two or more perspective discrete 3D modeled scenes, in response to additional data in a request specifying particular positions and/or orientations about the physical site.

Also, for example, only a partial matching between the request parameters and the generated 3D reconstructions is needed. For example, a request may specify a time period raging from May 15-July 15, which has a portion of time that overlaps the series of 3D modeled scenes (e.g., January 15-June 15). In this instance, the 3D modeled scenes matching the pertinent portion of the request may be retrieved and output according to the embodiments (e.g., May 15-June 15).

The time discrete outputs are transmitted 940 to a mobile device for display. The outputs include the portion of the 3D modeled scenes with time elements matching the additional time data of the request. The generated time discrete outputs can be transmitted together, as a single output file, for example, via a computer network to the mobile device. Also, it may be deemed appropriate to transmit each, or any partial group, of the generated time discrete outputs separately, so as to employ smaller file sizes that may be advantageous in networking environments with limited bandwidth, for instance.

According to the implementation, the time discrete outputs including portions of the series of 3D modeled scenes can be displayed 945 at the mobile device. As shown in FIG. 9C, one or more time discrete outputs can be superimposed 960 one another, for example, so as to collectively display time discrete 3D scenes. Displaying multiple time discrete outputs of a site, as a superimposition 960 for example, can support viewing various time discrete 3D scenes in direct relation to one another, thereby showing any altered areas of the site experienced during the time progression. Thus, a superimposed 3D scene, as realized by the embodiments, may result in making the distinct changes in the evolution of a construction site over time more visually apparent to a user. A superimposed visualization of time discrete 3D scenes 960 can be subsequently displayed at mobile device 965. Moreover, in one or more implementations, time discrete outputs can be downloaded to the mobile device 965 and displayed as superimposed images onto live imaging of the physical site.

In one or more implementations, displaying the time discrete outputs 945 can include visually matching the displayed 3D reconstruction with a current view of the physical site. For instance, as a mobile device is moved around at the physical site, the location of the mobile device can result in displaying a corresponding 3D modeled scene for that particular area of the site. Mobile device localization capabilities, as described in connection with FIG. 7, can be employed for determining and aligning the current location of a mobile device with a common coordinate system of a displayed 3D reconstruction. Viewing time discrete 3D modeled scenes in reference to a real-time image of the physical site may better show a time based progression of certain aspects of a building project against the current condition of the physical site. Thus, time discrete 3D modeled scenes, according to the embodiments, can be employed to realize certain BIM construction filed operational features such as tracking the development of a site over a period of time in a 3D environment.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data;
reconstructing a series of three dimensional (3D) modeled scenes of the physical site from the site data using the imaging data, the coordinate data, and the time metadata, wherein the reconstructing comprises, for each one of the 3D modelled scenes in the series, generating a respective 3D model, including textures for the respective 3D model, from source images that represent differing visual perspectives of the physical site;
receiving a request having associated position, orientation and time data, wherein the time data indicates a time period; and
generating, in response to the request, output for display of a portion of the 3D modeled scenes to represent the physical site based on the position, orientation and time data associated with the request, wherein the portion of the 3D modeled scenes is determined by the time period indicated by the request.

2. The method of claim 1, wherein the one or more capture devices comprise multiple capture devices including at least one camera that captures two dimensional (2D) images as the imaging data, and at least one scanner that captures 3D range data as the imaging data, wherein each of the multiple capture devices provides a different perspective of the physical site, and wherein generating the respective 3D model for at least one of the 3D modelled scenes in the series comprises:
extracting a dense 3D point cloud from the 2D images;
computing a coarse mesh from the dense 3D point cloud;
refining the coarse mesh on the 2D images to form an updated mesh of the at least one of the 3D modelled scenes; and
computing a UV atlas of the updated mesh for use in texture creation for the at least one of the 3D modelled scenes in the series.

3. The method of claim 1, wherein the one or more capture devices comprise a single capture device being an unmanned aerial vehicle that is positioned at the two or more locations about the physical site to provide different perspectives of the physical site.

4. The method of claim 1, wherein the one or more capture devices are programed to acquire the site data at predetermined capture times, wherein the predetermined capture times are separated by an hourly, daily, weekly or bi-monthly time interval within a selected time period that is at least one month, and wherein the physical site is a building construction site.

5. The method of claim 4, wherein the request is received from a mobile device located at the physical site, wherein the output for display of the portion of the 3D modeled scenes is transmitted to the mobile device for use in displaying the portion of the 3D modeled scenes at the mobile device, and wherein the portion of the 3D modeled scenes is at least one time slice from the predetermined capture times within the selected time period that falls within the time period indicated by the request.

6. The method of claim 5, comprising creating for display on a user interface element of the mobile device an animation of movement in 3D space and time, based on user specified paths in 3D space and time transitions, with respect to the portion of the 3D modeled scenes displayed at the mobile device, where textures are blended together to transition between time periods in the animation, and the movement in 3D space and time is across time-sliced 3D visualizations of the physical site to show changes of the physical site over time.

7. The method of claim 5, comprising iteratively generating two or more perspective discrete outputs for display of the portion of the 3D modeled scenes based on additionally received position and orientation data, wherein the additionally received position and orientation data is generated through motion input via physical movement of the mobile device.

8. The method of claim 5, comprising iteratively generating two or more time discrete outputs for display, wherein the two or more time discrete outputs correspond to portions of the 3D modeled scenes with time metadata associated with additionally received time data through a user interface element of the mobile device, the time metadata comprises timestamps, and the portions of the 3D modeled scenes is two or more time discrete 3D scenes representing selected days during a lifecycle of a construction project.

9. The method of claim 8, wherein the two or more time discrete outputs are displayed as two dimensional (2D) images or 3D scenes at the mobile device.

10. The method of claim 8, wherein the iteratively generating the two or more time discrete outputs for display comprises generating a modeled scene to be superimposed, using semitransparency, onto live imaging data of the physical site currently captured by the mobile device, wherein the superimposed modeled scene is displayed as 2D images or 3D scenes at the mobile device.

11. The method of claim 1, wherein the physical site is a first physical site of a first project, the series of 3D modeled scenes are a series of first 3D modeled scenes in a first coordinate space, and the method comprising:
loading a series of second 3D modeled scenes in a second coordinate space for a second physical site of a second project, the second physical site of the second project being a different site from the first physical site of the first project; and
registering the first coordinate space with the second coordinate space;
wherein the generating comprises superimposing, using semitransparency, the portion of the first 3D modeled scenes of the first physical site on a portion of the second 3D modeled scenes of the second physical site.

12. A system comprising:
a computer network;
one or more capture devices communicatively coupled with the computer network, wherein the one or more capture devices are positioned about a physical site and programed to acquire site data associated with two or more locations about the physical site;

one or more computing devices communicatively coupled with the computer network and programed to (i) obtain the site data acquired by the one or more capture devices, wherein the site data comprises data sets corresponding to the two or more locations about the physical site, and each respective data set comprises (a) imaging data of the physical site, (b) coordinate data for the imaging data, and (c) time metadata for the imaging data, (ii) reconstruct a series of three dimensional (3D) modeled scenes of the physical site from the site data using the imaging data, the coordinate data, and the time metadata, wherein the one or more computing devices are programed to, for each one of the 3D modelled scenes reconstructed in the series, generate a respective 3D model, including textures for the respective 3D model, from source images that represent differing visual perspectives of the physical site, (iii) receive a request having associated position, orientation and time data, wherein the time data indicates a time period; and (iv) generate, in response to the request, output for display of a portion of the 3D modeled scenes to represent the physical site based on the position, orientation and time data associated with the request, wherein the portion of the 3D modeled scenes is determined by the time period indicated by the request.

13. The system of claim 12, wherein the one or more capture devices comprise multiple capture devices including at least one camera that captures two dimensional (2D) images as the imaging data, and at least one scanner that captures 3D range data as the imaging data, wherein each of the multiple capture devices provides a different perspective of the physical site, and wherein the one or more computing devices are programed to generate the respective 3D model for at least one of the 3D modelled scenes in the series by being programed to:
    extract a dense 3D point cloud from the 2D images;
    compute a coarse mesh from the dense 3D point cloud;
    refine the coarse mesh on the 2D images to form an updated mesh of the at least one of the 3D modelled scenes; and
    compute a UV atlas of the updated mesh for use in texture creation for the at least one of the 3D modelled scenes in the series.

14. The system of claim 12, wherein the one or more capture devices comprise a single capture device being an unmanned aerial vehicle that is positioned at the two or more locations about the physical site to provide different perspectives of the physical site.

15. The system of claim 12, wherein the one or more capture devices are programed to acquire the site data at predetermined capture times, and wherein the predetermined capture times are separated by an hourly, daily, weekly or bi-monthly time interval within a selected time period that is at least one month.

16. The system of claim 15, wherein the physical site is a building construction site.

17. The system of claim 15, comprising a mobile device communicatively coupled with the computer network, wherein the mobile device is located at the physical site and programed to (i) transmit the request, (ii) receive the output of the portion of the 3D modeled scenes, and (iii) display the output of the portion of the 3D modeled scenes, and wherein the portion of the 3D modeled scenes is at least one time slice from the predetermined capture times within the selected time period that falls within the time period indicated by the request.

18. The system of claim 17, wherein the mobile device comprises a user interface element, the one or more computing devices are programed to create for display on the user interface element of the mobile device an animation of movement in 3D space and time, based on user specified paths in 3D space and time transitions, with respect to the portion of the 3D modeled scenes displayed at the mobile device, where textures are blended together to transition between time periods in the animation, and the movement in 3D space and time is across time-sliced 3D visualizations of the physical site to show changes of the physical site over time.

19. The system of claim 17, wherein the one or more computing devices are programed to iteratively generate two or more perspective discrete outputs for display of the portion of the 3D modeled scenes based on additionally received position and orientation data, wherein the additionally received position and orientation data is generated through motion input via physical movement of the mobile device.

20. The system of claim 17, wherein the one or more computing devices are programed to iteratively generate two or more time discrete outputs for display, wherein the two or more time discrete outputs correspond to portions of the 3D modeled scenes with time metadata associated with additionally received time data through a user interface element of the mobile device, the time metadata comprises timestamps, and the portions of the 3D modeled scenes is two or more time discrete 3D scenes representing selected days during a lifecycle of a construction project.

21. The system of claim 20, wherein the two or more time discrete outputs are displayed as 2D images or 3D scenes at the mobile device.

22. The system of claim 20, wherein the one or more computing devices are programed to iteratively generate the two or more time discrete outputs for display by being programed to generate a modeled scene to be superimposed, using semitransparency, onto live imaging data of the physical site currently captured by the mobile device, wherein the superimposed modeled scene is displayed as 2D images or 3D scenes at the mobile device.

23. A non-transitory computer-readable medium encoding instructions programmed to cause one or more hardware processors of one or more computing devices to perform operations comprising:
    obtaining site data captured by one or more capture devices, wherein the site data comprises data sets corresponding to one or more viewpoints of a physical site, and each respective data set comprises imaging data of the physical site and time metadata for the imaging data;
    reconstructing a series of three dimensional (3D) modeled scenes of the physical site, within a reference coordinate system for the physical site, using the imaging data and the time metadata, wherein the reconstructing comprises, for each one of the 3D modelled scenes in the series, generating a respective 3D model, including textures for the respective 3D model, from source images that represent differing visual perspectives of the physical site;
    obtaining two-dimensional (2D) image data of the physical site captured by a mobile device at the physical site;
    localizing the 2D image data by aligning the 2D image data with a reference 3D modeled scene from the series of 3D modeled scenes of the physical site, wherein the aligning comprises matching points in the 2D image data with the reference 3D modeled scene within the reference coordinate system;

obtaining 3D information regarding the physical site and corresponding to the aligned 2D image data, the 3D information including information from the 3D modelled scenes in the series; and generating for display the 3D information within a context of the aligned 2D image data.

24. The non-transitory computer-readable medium of claim 23, wherein the one or more capture devices comprises at least one unmanned aerial vehicle that captures the imaging data.

25. The non-transitory computer-readable medium of claim 23, wherein reconstructing the series of 3D modeled scenes of the physical site comprises generating the series of 3D modeled scenes of the physical site with each respective 3D scene in the series corresponding to images captured at a time interval within a selected time period, and the reference 3D modeled scene is a most recently reconstructed 3D scene in the series of 3D modeled scenes based on the time metadata.

26. The non-transitory computer-readable medium of claim 25, wherein localizing the 2D image data comprises using additional position information obtained from one or more built-in sensors of the mobile device, the selected time period is three months, and the time interval is weekly.

27. The non-transitory computer-readable medium of claim 25, wherein the mobile device is a tablet computer, the localizing is performed at a server computer configured to respond to requests from the tablet computer, the selected time period is at least one month, and the time interval is hourly, daily, weekly or bi-monthly.

28. The non-transitory computer-readable medium of claim 25, wherein obtaining the 3D information comprises obtaining a portion of a 3D model of a building under construction at the physical site, the display of the 3D information includes showing the portion of the 3D model of the building under construction at the physical site, and the operations comprise:

creating an animation of movement in 3D space and time, based on user specified paths in 3D space and time transitions, with respect to the portion of the 3D model of the building under construction at the physical site, where textures are blended together to transition between time periods in the animation, and the movement in 3D space and time is across time-sliced 3D visualizations of the physical site to show changes of the physical site over time.

29. The transitory computer-readable medium of claim 28, wherein generating for display the 3D information within the context of the aligned 2D image data comprises causing the mobile device to superimpose, using semitransparency, the portion of the 3D model on the 2D image data at the mobile device.

30. The computer-readable medium of claim 28, wherein generating for display the 3D information within the context of the aligned 2D image data comprises causing the mobile device to render the portion of the 3D model on the mobile device from a same viewpoint as that of the 2D image data.

* * * * *

UNITED STATES PATENT AND TRADEMARK OFFICE
CERTIFICATE OF CORRECTION

| | |
|---|---|
| PATENT NO. | : 10,593,104 B2 |
| APPLICATION NO. | : 15/394689 |
| DATED | : March 17, 2020 |
| INVENTOR(S) | : Luc Robert and Emmanuel Gallo |

It is certified that error appears in the above-identified patent and that said Letters Patent is hereby corrected as shown below:

In the Claims

Column 32, Line 19, in Claim 29: delete "transitory" and insert --non-transitory--, therefor.

Column 32, Line 25, in Claim 30: after "The" insert --non-transitory--.

Signed and Sealed this
Twelfth Day of May, 2020

Andrei Iancu
*Director of the United States Patent and Trademark Office*